(12) United States Patent
Kurokawa et al.

(10) Patent No.: US 9,373,999 B2
(45) Date of Patent: Jun. 21, 2016

(54) POWER SUPPLY DEVICE

(71) Applicant: HONDA MOTOR CO., LTD., Tokyo (JP)

(72) Inventors: Manabu Kurokawa, Sakura (JP); Toshihiro Sone, Shioya-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 6 days.

(21) Appl. No.: 14/030,691

(22) Filed: Sep. 18, 2013

(65) Prior Publication Data

US 2014/0084879 A1    Mar. 27, 2014

(30) Foreign Application Priority Data

Sep. 21, 2012 (JP) ................................ 2012-208848

(51) Int. Cl.
| H02M 1/00 | (2007.01) |
| H02M 3/04 | (2006.01) |
| H02J 7/00 | (2006.01) |
| H02J 1/10 | (2006.01) |
| H02M 3/158 | (2006.01) |

(52) U.S. Cl.
CPC ................. *H02M 3/04* (2013.01); *H02M 3/158* (2013.01)

(58) Field of Classification Search
CPC .................. H02M 3/04; H02M 3/158; H02M 2001/0067; H02M 2001/0083; H02M 2001/0093; H02J 7/0024; H02J 7/14; H02J 7/1423; H02J 1/10
See application file for complete search history.

(56) References Cited

U.S. PATENT DOCUMENTS

| 2012/0187755 A1* | 7/2012 | Sone ....................... B60L 1/003 307/9.1 |
| 2012/0187887 A1* | 7/2012 | Sone .................... B60L 11/1868 318/504 |

(Continued)

FOREIGN PATENT DOCUMENTS

| DE | 10 2008 053 609 A1 | 4/2010 |
| JP | 2010-183767 A | 8/2010 |
| JP | 2010-183768 A | 8/2010 |

(Continued)

OTHER PUBLICATIONS

Japanese Notice of Allowance dated Jul. 29, 2014, issued in Japanese Patent Application No. 2012-208848, w/ English translation (6 pages).

(Continued)

*Primary Examiner* — Timothy J Dole
*Assistant Examiner* — Sisay G Tiku
(74) *Attorney, Agent, or Firm* — Westerman, Hattori, Daniels & Adrian, LLP

(57) ABSTRACT

A connection switch control part that, within a voltage change period where an applied voltage to an inverter can be changed by repeatedly and alternately switching to a serial state where a first power supply and a second power supply are connected in series to the inverter and to a parallel state where the first power supply and the second power supply are connected in parallel to the inverter, provides: a first period during which current of either one of the first power supply and the second power supply changes with an increasing trend, and current of the other one changes with a decreasing trend; and a second period during which current of one of the power supplies changes with a decreasing trend and current of the other power supply changes with an increasing trend.

1 Claim, 20 Drawing Sheets

(56) References Cited

U.S. PATENT DOCUMENTS

2013/0342151 A1* 12/2013 Kurokawa ............. H02M 7/537 318/500
2014/0265605 A1* 9/2014 Ishigaki ................ H02M 3/158 307/80

FOREIGN PATENT DOCUMENTS

| JP | 2012-070514 A | 4/2012 | |
| WO | 2011/092774 A1 | 8/2011 | |
| WO | 2012/006746 A1 | 1/2012 | |
| WO | 2012/053027 A1 | 4/2012 | |
| WO | WO 2015033553 A1 * | 3/2015 | .............. H02M 3/02 |

OTHER PUBLICATIONS

German Search Report dated Feb. 4, 2014, issued in corresponding German application No. 10 2013 218 5170, w/ English translation (10 pages).

* cited by examiner

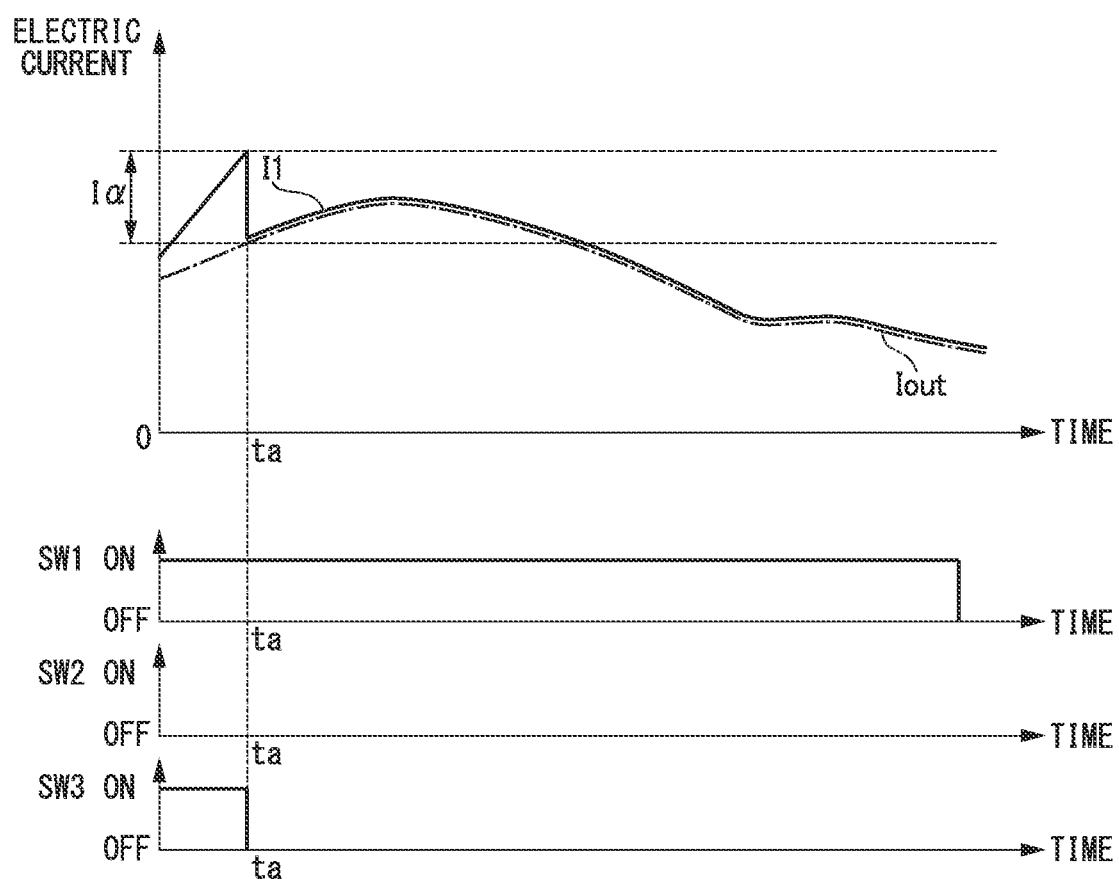

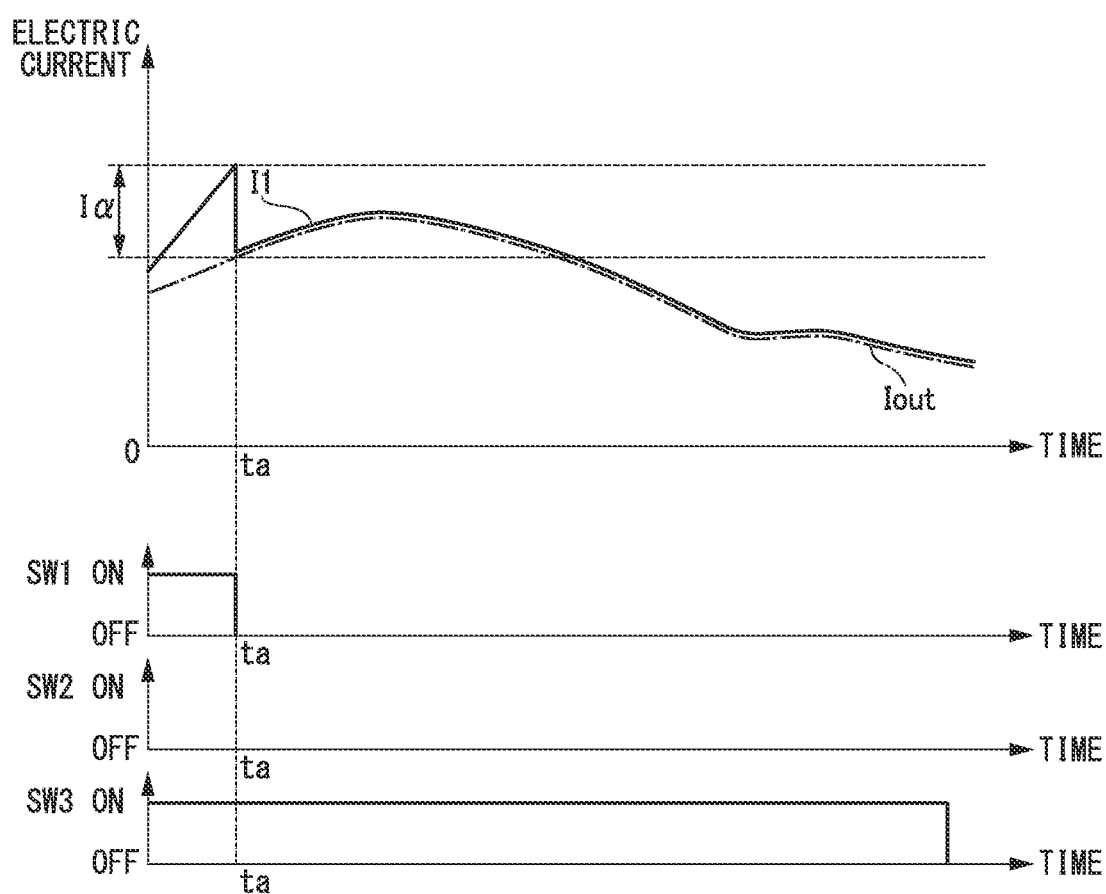

POWER SUPPLY DEVICE

CROSS-REFERENCE TO RELATED APPLICATION

Priority is claimed on Japanese Patent Application No. 2012-208848, filed Sep. 21, 2012, the contents of which are incorporated herein by reference.

BACKGROUND

1. Technical Field

The present invention relates to a power supply device.

2. Background Art

Heretofore, there is known a power supply system in which, for example, two output circuits each having a reactor and a DC power supply connected in series therein can be switched into a serial connection and a parallel connection to be connected to an electrical load (for example, refer to Japanese Unexamined Patent Application, First Publication No. 2012-070514 (FIG. 10 through FIG. 12)).

In this power supply system, when performing a step-up operation with respect to each DC power supply in the parallel connection, input and output of electric power to and from each DC power supply can be controlled independently since there is no current supply path to the DC power supply of each other and there is no interaction between each other.

Moreover, in this power supply system, when performing a step-up operation with respect to both of the DC power supplies in the serial connection, there is formed, based on the difference in voltage and inductance between each other, a current supply path, through which a differential current of the current flowing to each reactor (reactor current) flows.

SUMMARY

In the power supply system of the above conventional technique, it is merely that input and output of electric power to and from each DC power supply are independently controlled when performing a step-up operation with respect to each DC power supply in the parallel connection.

For example, in a parallel operation, in a state where energy is being supplied from one of the DC power supplies, energy cannot be supplied from the other DC power supply, and there is a problem that energy cannot be supplied from two DC power supplies simultaneously.

Moreover, for example, although energy can be supplied simultaneously from two DC power supplies in the serial operation, energy distribution is decided based on a voltage ratio between two DC power supplies, and the amount of energy to be supplied from each DC power supply cannot be actively controlled. Accordingly, there is a problem that one DC power supply that has a lower electric power supply capacity limits the electric power supply of the other DC power supply.

An aspect of the present invention takes into consideration the above circumstances, with an object of providing a power supply device capable of controlling voltage and current ratio of a plurality of output circuits that can be switched to a serial connection and to a parallel connection with respect to an electrical load, to thereby arbitrarily set the output balance of the plurality of output circuits.

The aspect of the present invention employs the following measures in order to solve the above problems and achieve the object.

A power supply device of an aspect of the present invention is a power supply comprising a plurality of output circuits, wherein: the each output circuit is provided with a reactor and a power supply connected in series; and there is provided a control device that, within a voltage change period where an applied voltage to the electrical load can be changed by repeatedly and alternately switching to a serial connection state where the plurality of output circuits are connected in series to an electrical load and to a parallel connection state where the plurality of output circuits are connected in parallel to the electrical load, provides: a first period during which current that flows to at least one of the reactors of part of the plurality of output circuits changes with an increasing trend, and current that flows to the other reactor changes with a decreasing trend; and a second period during which current that flows to the one reactor changes with a decreasing trend and current that flows to the other reactor changes with an increasing trend.

According to the aspect above, by providing the first period and the second period within the voltage change period during, during which the serial connection state and the parallel connection state are repeatedly and alternately switched, it is possible to simultaneously control applied voltage and output current ratio of the plurality of output circuits.

Furthermore, by providing the first period and the second period within the voltage change period, it is possible to arbitrarily set output balance while constantly outputting electric power from the plurality of output circuits. As a result, for example, it is possible to prevent one output circuit with a lower output capacity from limiting output of the other output circuit.

BRIEF DESCRIPTION OF THE DRAWINGS

FIG. 5 is a diagram showing first reactor current I1 and output current Iout and the state of first to third switching elements in the second power-running time control in the parallel mode as an operating mode of the power supply device of the embodiment of the present invention.

FIG. 7 is a diagram showing first reactor current I1 and output current Iout and the state of first to third switching elements in the third regenerating time control in the parallel mode as an operating mode of the power supply device of the embodiment of the present invention.

DESCRIPTION OF EMBODIMENTS

Hereunder, a power supply device according to an embodiment of the present invention is described, with reference to the accompanying drawings.

Figure 1:
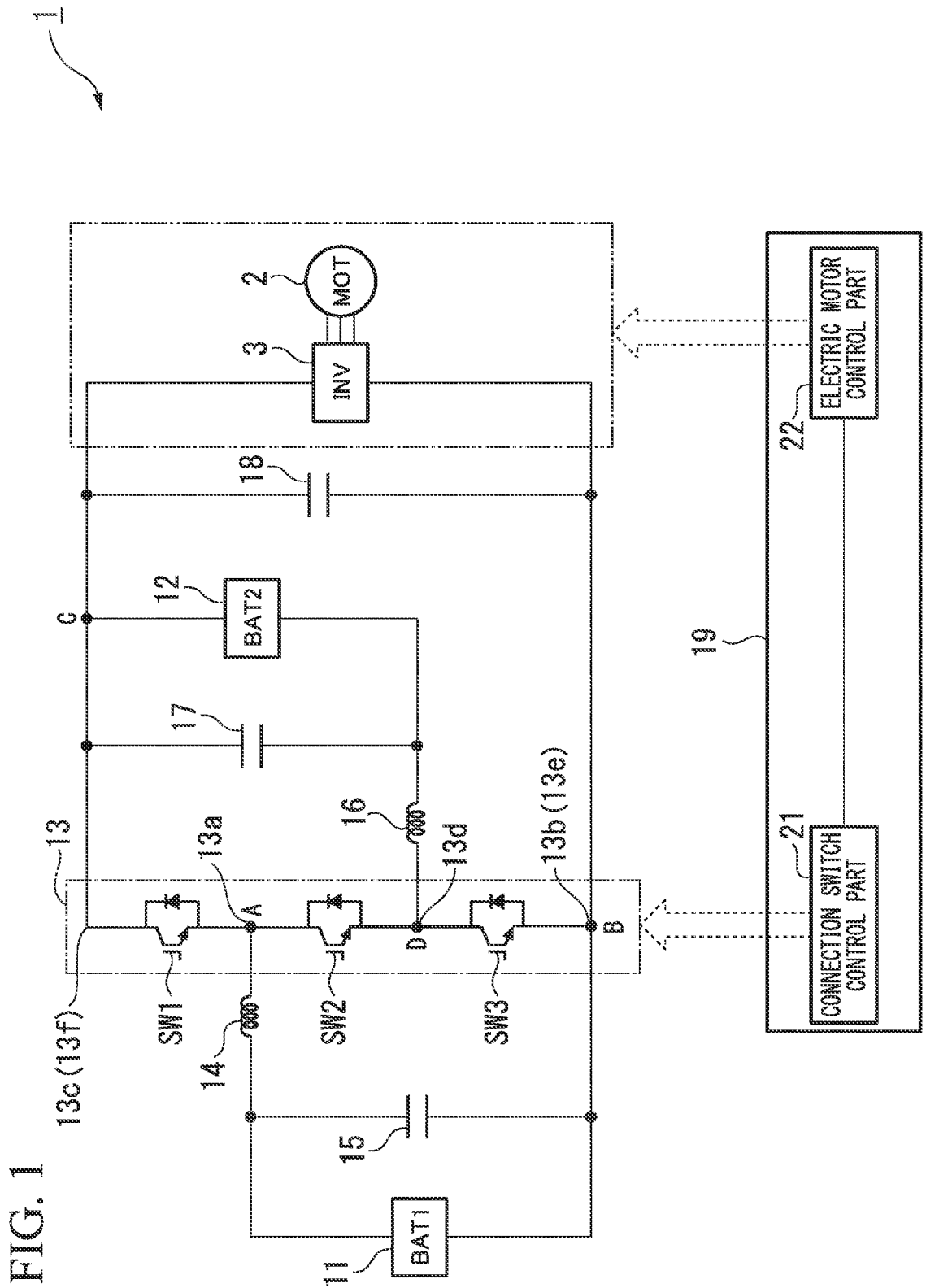
FIG. 1 is a configuration diagram of a power supply device according to an embodiment of the present invention.

For example as shown in FIG. 1, a power supply device 1 of the present embodiment is a power supply that supplies direct current electric power to an inverter 3 (electrical load) that controls power-running and regenerating of an electric motor (MOT) 2 (electrical load) for generating propulsion force of a vehicle.

The power supply device 1 comprises, for example: a first power supply 11 (power supply, output circuit); a second power supply 12 (power supply, output circuit); a switch circuit 13; a first reactor 14 (reactor, output circuit); a first capacitor 15 that is connected to both ends of the first power supply 11; a second reactor 16 (reactor, output circuit); a second capacitor 17 that is connected to both ends of the second power supply 12; a third capacitor 18 that is connected to direct current side both ends of the inverter 3; and a control device 19.

Between two output terminals 13e and 13f of the switch circuit 13, there is connected the inverter 3.

The first power (BAT 1) 11 is, for example, a battery or the like, and a positive electrode terminal thereof is connected to a first node A, and a negative electrode terminal thereof is connected to a second node B.

The second power (BAT 2) 12 is, for example, a battery or the like, and a positive electrode terminal thereof is connected to a third node C, and a negative electrode terminal thereof is connected to a fourth node D.

The switch circuit 13 is provided with: four input terminals 13a to 13d that are respectively connected to the first node A, the second node B, the third node C, and the fourth node D; and the two output terminals 13e and 13f.

The second input terminal 13b serves also as one of the output terminals 13e, and the third input terminal 13c serves also as the other output terminal 13f.

The switch circuit 13 is provided, for example, with first to third switching elements (for example, IGBT: insulated gate bipolar mode transistor) SW1, SW2, and SW3 that are connected in series.

A collector of the first switching element SW1 is connected to the third input terminal 13c, and an emitter thereof is connected to the first input terminal 13a.

Moreover, a collector of the second switching element SW2 is connected to the first input terminal 13a, and an emitter thereof is connected to the fourth input terminal 13d.

Furthermore, a collector of the third switching element SW3 is connected to the fourth input terminal 13d, and an emitter thereof is connected to the second input terminal 13b.

Between the emitter and the collector of the respective switching elements SW1, SW2, and SW3, there is connected a diode each in the forward direction from the emitter toward the collector.

This switch circuit 13 is driven by pulse width modulated (PWM) signals that are output from the control device 19 and are input to gates of the respective switching elements SW1, SW2, and SW3, for example.

Figure 2A:
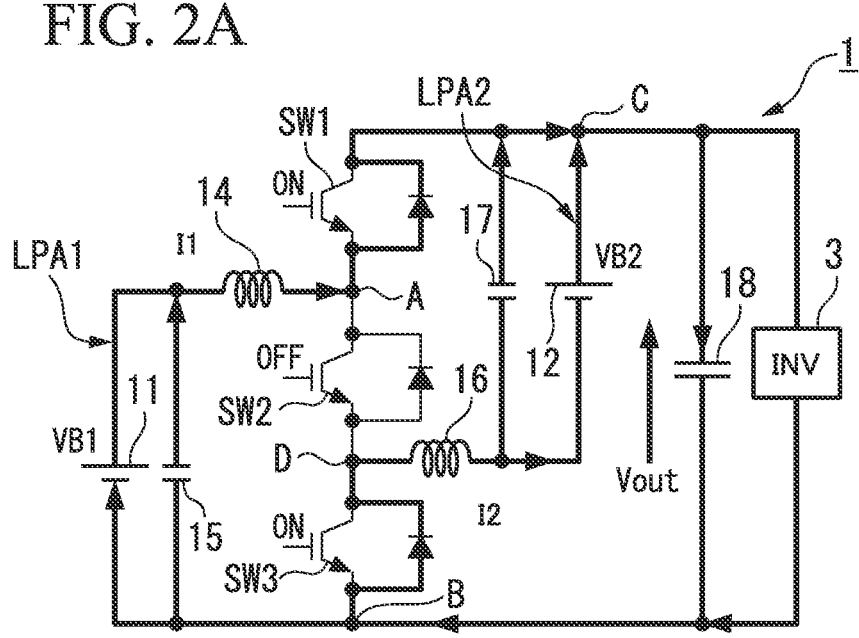
FIG. 2A is a diagram showing a parallel mode as an operating mode of the power supply device of the embodiment of the present invention.

As shown in FIG. 2A for example, in the parallel mode as an operating mode of the power supply device 1, in the switch circuit 13, the first switching element SW1 and the third switching element SW3 are fixed to close (ON) and the second switching element SW2 is fixed to open (OFF). As a result, the first power supply 11 and the second power supply 12 are connected in parallel to the inverter 3.

Moreover, in the switch circuit 13, in the parallel mode, for example, by fixing the second switching element SW2 to open (OFF) and switching the first switching element SW1 and the third switching element SW3 to close (ON) and to open (OFF), the current ratio of the first power supply 11 and the second power supply 12 (alternatively, electric power ratio of output or input) can be changed.

Figure 2B:
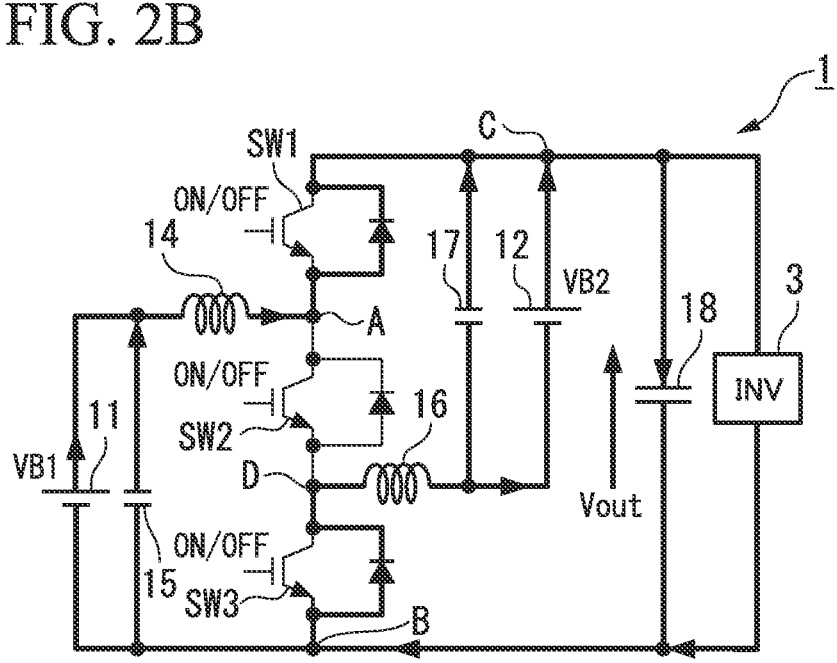
FIG. 2B is a diagram showing a shift mode as an operating mode of the power supply device of the embodiment of the present invention.
Figure 2C:
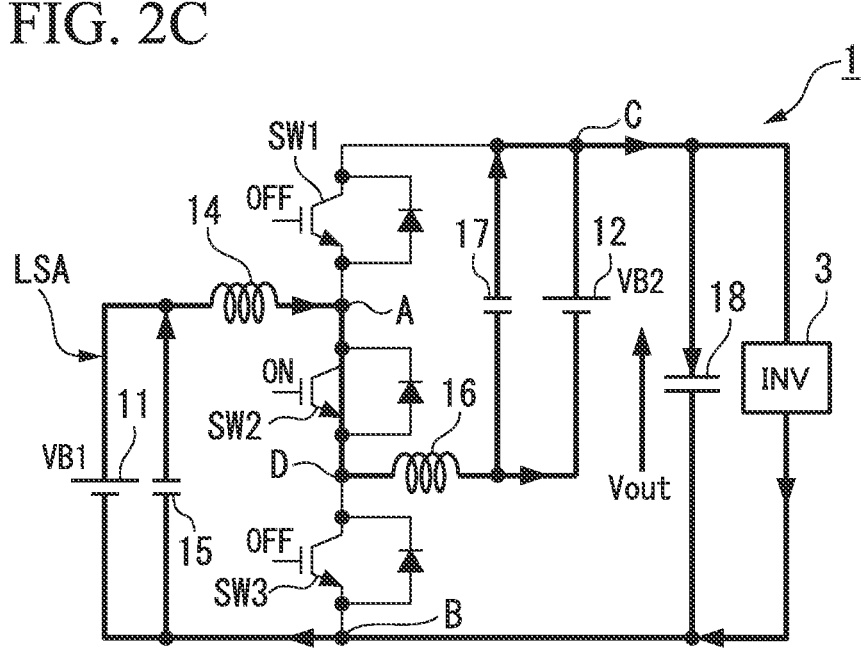
FIG. 2C is a diagram showing a serial mode as an operating mode of the power supply device of the embodiment of the present invention.

Furthermore, as shown in FIG. 2C for example, in the serial mode as an operating mode of the power supply device 1, in the switch circuit 13, the first switching element SW1 and the third switching element SW3 are fixed to open (OFF) and the second switching element SW2 is fixed to close (ON). As a result, the first power supply 11 and the second power supply 12 are connected in series to the inverter 3.

Moreover, as shown in FIG. 2B for example, in the shift mode as an operating mode of the power supply device 1, in the switch circuit 13, the respective first to third switching elements SW1, SW2, and SW3 can be independently switched to close (ON) and to open (OFF). As a result, the step-up ratio and the current ratio of the first power supply 11 and the second power supply 12 (electric power ratio of output or input) can be changed.

For example, in the step-up ratio control execution mode of the shift mode, in the switch circuit 13, the pair of the first switching element SW1 and the third switching element SW3, and the second switching element SW2 are inverted and alternately switched to close and open (ON/OFF).

For example, in the current control execution mode of the shift mode, in the switch circuit 13, there are provided a first period and a second period, during which the second switching element SW2 is fixed to close (ON), and the first switching element SW1 and the third switching element SW3 are inverted and alternately switched to close and open (ON/OFF).

The first reactor 14 is arranged between the first power supply 11 and the first node A.

To describe in more detail, one end of the first reactor 14 is connected to the positive electrode terminal of the first power supply 11, and the other end of the first reactor 14 is connected to a node between the emitter and the collector of the first and second switching elements SW1 and SW2 of the switch circuit 13.

The first capacitor 15 is connected between the positive electrode terminal and the negative electrode terminal of the first power supply 11.

The second reactor 16 is arranged between the fourth node D and the second power supply 12.

To describe in more detail, one end of the second reactor 16 is connected to a node between the emitter and the collector of the second and third switching elements SW2 and SW3 of the switch circuit 13, and the other end of the second reactor 16 is connected to the negative electrode terminal of the second power supply 12.

The second capacitor 17 is connected between the positive electrode terminal and the negative electrode terminal of the second power supply 12.

The third capacitor 18 is connected between the positive electrode terminal and the negative electrode terminal on the direct current side of the inverter 3.

The control device 19 comprises, for example, a connection switch control part 21 (control device) and an electric motor control part 22.

As shown in FIG. 2A through FIG. 2C for example, the connection switch control part 21 controls the switch circuit 13 in the parallel mode, the serial mode, and the shift mode as operating modes of the power supply device 1.

In the parallel mode for example, the connection switch control part 21 instructs the first switching element SW1 and the third switching element SW3 to be fixed to close (ON) and the second switching element SW2 to be fixed to open (OFF), and connects the first power supply 11 and the second power supply 12 to the inverter 3 in parallel.

To describe in more detail, with the second switching element SW2 being fixed to OFF and the first switching element SW1 being fixed to ON, there is formed a current loop LPA1 in which the first power supply 11 and the first capacitor 15, the first reactor 14, the first switching element SW1, and the inverter 3 and the third capacitor 18 are sequentially connected in series.

Moreover, with the second switching element SW2 being fixed to OFF and the third switching element SW3 being fixed to ON, there is formed a current loop LPA2 in which the third power supply switching element SW3, the second reactor 16, the second power supply 12 and the second capacitor 17, and the inverter 3 and the third capacitor 18 are sequentially connected in series.

Figure 3A:
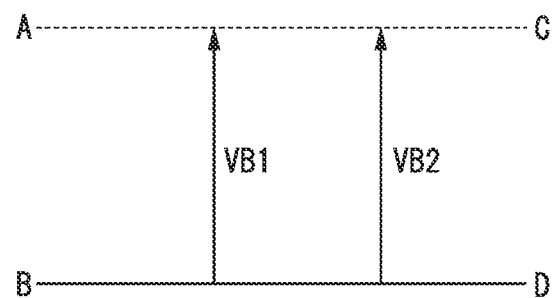
FIG. 3A is a diagram showing potential of each node in the parallel mode as an operating mode of the power supply device of the embodiment of the present invention.

In this parallel mode, for example, in the case where a voltage VB1 output from the first power supply 11 and a voltage VB2 output from the second power supply 12 are not equal to each other, as shown in FIG. 3A, the first node A and the third node C have the same potential, and the second node B and the fourth node D have the same potential. Between the positive electrode terminal and the negative electrode terminal on the direct current side of the inverter 3, there is applied a voltage VB1 of the first power supply 11 and a voltage VB2 of the second power supply 12, which are equal to each other.

Furthermore, in the serial mode for example, the connection switch control part 21 instructs the first switching element SW1 and the third switching element SW3 to be fixed to open (OFF) and the second switching element SW2 to be fixed to close (ON), and connects the first power supply 11 and the second power supply 12 to the inverter 3 in series.

To describe in more detail, with the second switching element SW2 being fixed to ON and the first switching element SW1 and the third switching element SW3 being fixed to OFF, there is formed a current loop LSA in which the first power supply 11 and the first capacitor 15, the first reactor 14, the second switching element SW2, the second reactor 16, the second power supply 12 and the second capacitor 17, and the inverter 3 and the third capacitor 18 are sequentially connected in series.

Figure 3B:
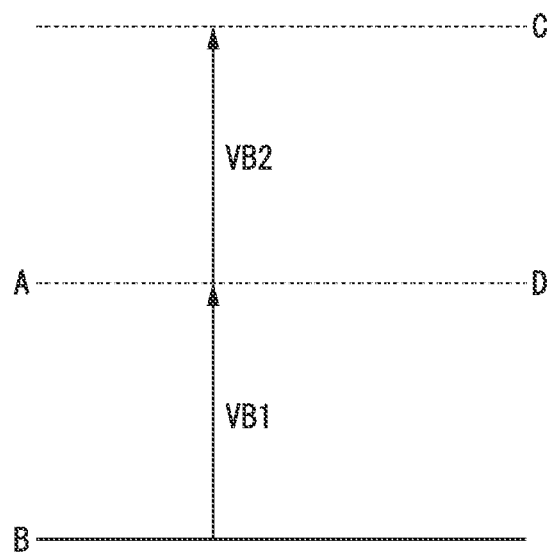
FIG. 3B is a diagram showing potential of each node in the serial mode as an operating mode of the power supply device of the embodiment of the present invention.

In this serial mode, for example, in the case where the voltage VB1 output from the first power supply 11 and the voltage VB2 output from the second power supply 12 are equal to each other, as shown in FIG. 3B, the first node A and the fourth node D have the same potential, and a voltage sum of the voltage VB1 of the first power supply 11 and the voltage VB2 of the second power supply 12 is applied between the positive electrode terminal and the negative electrode terminal on the direct current side of the inverter 3.

Moreover, for example, when switching the serial mode and the parallel mode, the connection switch control part 21 executes step-up ratio control of the shift mode.

In this step-up ratio control, for example, between the positive electrode terminal and the negative electrode terminal on the direct current side of the inverter 3, there is applied a voltage within a voltage range between the voltage VB1 of the first power supply 11 or the voltage VB2 of the second power supply 12, and the voltage sum (VB1+VB2) of the voltage VB1 of the first power supply 11 or the voltage VB2 of the second power supply 12.

Furthermore, for example, in the case where the remaining energy amount (for example, remaining capacity or the like) of the first power supply 11 or the second power supply 12 is less than a predetermined lower limit threshold value in the serial mode and the remaining energy amounts become unbalanced, the connection switch control part 21 executes the current control of the shift mode.

In this current control, for example, the current ratio of the first power supply 11 and the second power supply 12 (or electric power ratio of output or input) is changed, and it is set so that either one of the first power supply 11 and the second power supply 12 with a higher amount of remaining energy outputs a higher amount of energy. Thereby, the unbalanced remaining energy amounts are balanced.

Hereunder, there are described in detail operations of the connection switch control part 21 in the parallel mode, the shift mode, and the serial mode.

For example in the parallel mode, by fixing the second switching element SW2 to open (OFF) and switching the first switching element SW1 and the third switching element SW3 to close (ON) and to open (OFF), the connection switch control part 21 can change the current ratio of the first power supply 11 and the second power supply 12.

Figure 4A:
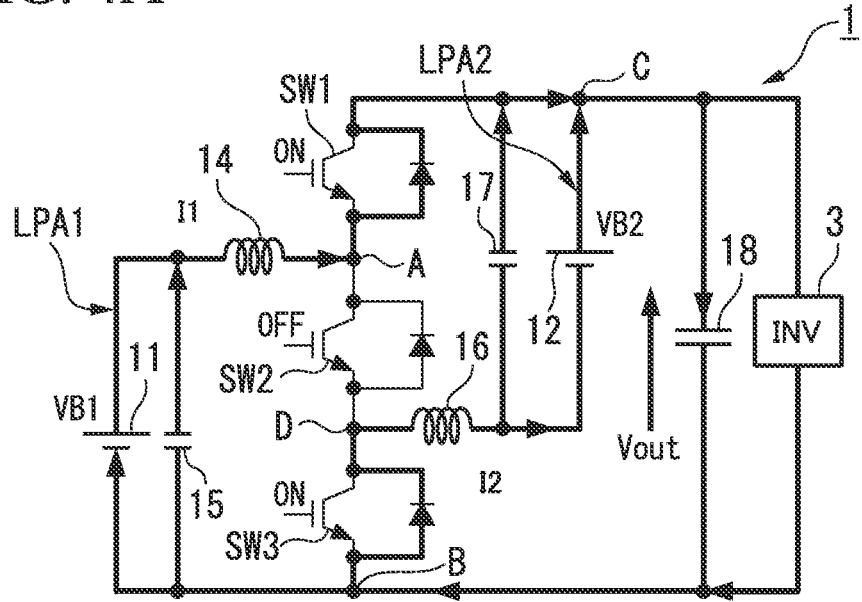
FIG. 4A is a diagram showing a first power-running time control in the parallel mode as an operating mode of the power supply device of the embodiment of the present invention.

For example, at the time of performing power-running of the electric motor (MOT) 2, as shown in FIG. 4A for example, in a predetermined first power-running time control, the connection switch control part 21 forms current loops LPA1 and LPA2, and thereby connects the first power supply 11 and the second power supply 12 to the inverter 3 in parallel.

The predetermined first power-running time control is executed for example in the case where the absolute value |I1_ave| of the average current I1_ave of the current I1 flowing in the first reactor 14 (first reactor current) and the absolute value |I2_ave| of the average current I2_ave of the current I2 flowing in the second reactor 16 (second reactor current) are smaller than the value as being the sum of the absolute value |Iout| of the output current Iout flowing between the positive electrode terminal and the negative electrode terminal on the direct current side of the inverter 3 and a predetermined current value Iα (that is, where |I1_ave|<|Iout|+Iα, and also |I2_ave|<|Iout|+Iα).

Accordingly, the output voltage Vout applied between the positive electrode terminal and the negative electrode terminal on the direct current side of the inverter 3 becomes equal to the voltage VB1 of the first power supply 11 and the voltage VB2 of the second power supply 12, and electric power is equally supplied to the inverter 3 from both of the first power supply 11 and the second power supply 12.

The respective average currents I1_ave and I2_ave of the first reactor current I1 and the second reactor current I2 are, for example, average currents in one cycle (switching cycle) or one carrier cycle of PWM signals that control the respective switching elements SW1, SW2, and SW3.

Figure 4B:
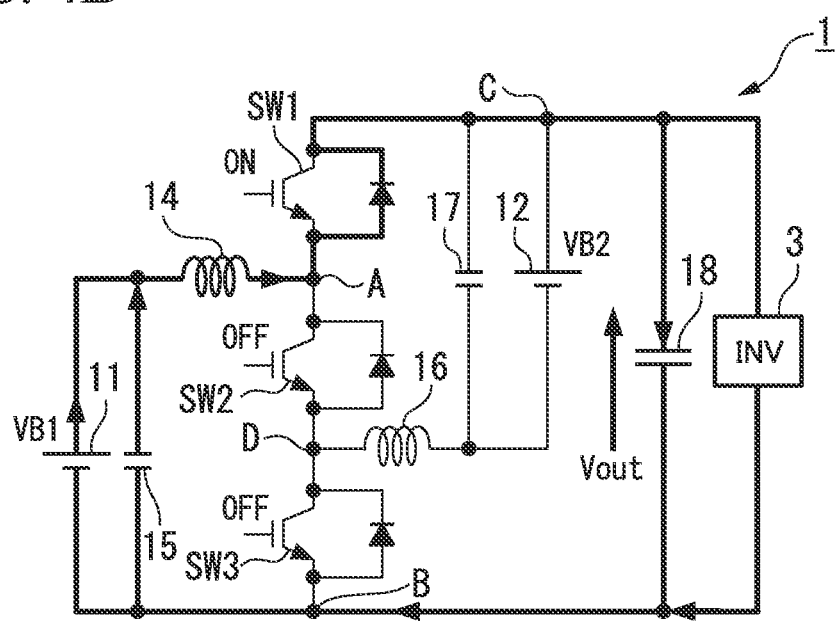
FIG. 4B is a diagram showing a second power-running time control in the parallel mode as an operating mode of the power supply device of the embodiment of the present invention.

Moreover, for example, at the time of performing power-running of the electric motor (MOT) 2, in a predetermined second power-running time control, the connection switch control part 21 fixes the second switching element SW2 to OFF and the first switching element SW1 to ON as shown in FIG. 4B for example. Furthermore, with the third switching element SW3 being fixed to OFF, only the first power supply 11 is connected to the inverter 3.

The predetermined second power-running time control is executed, for example, in the case where the absolute value |I1_ave| of the average current I1_ave of the first reactor current I1 is greater than the value as being the sum of the absolute value |Iout| of the output current Iout and the predetermined current value Iα (that is, where |I1_ave|>|Iout|+Iα).

Accordingly, the connection switch control part 21 supplies electric power to the inverter 3, for example, only from the first power supply 11, of which the voltage is higher than the second power supply 12.

For example, in the case where only the first power supply 11 is connected to the inverter 3, as illustrated at time ta and thereafter shown in FIG. 5 for example, the output current Iout is equal to the first reactor current I1, and the output voltage Vout applied between the positive electrode terminal and the negative electrode terminal on the direct current side of the inverter 3 is equal to the voltage VB1 of the first power supply 11. Accordingly, electric power is supplied to the inverter 3 only from the first power supply 11.

Figure 4C:
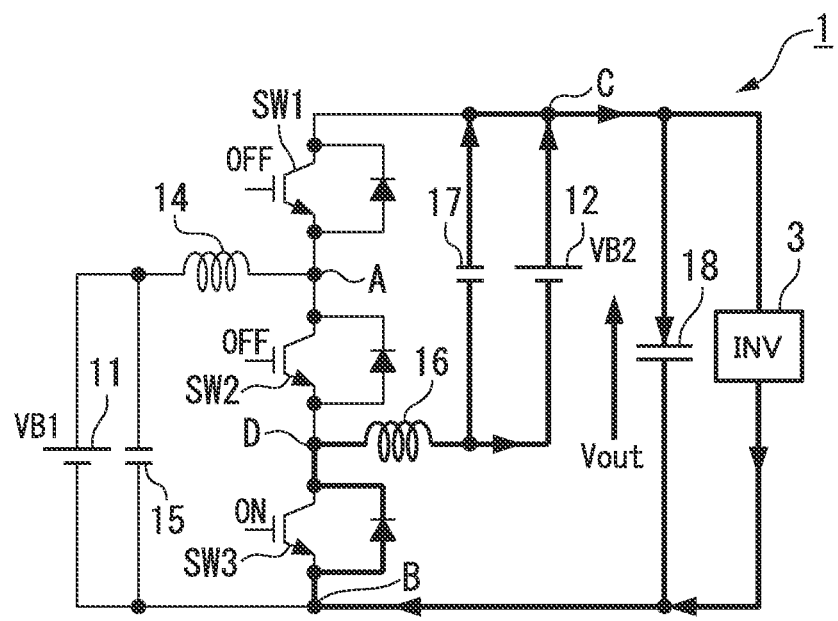
FIG. 4C is a diagram showing a third power-running time control in the parallel mode as an operating mode of the power supply device of the embodiment of the present invention.

Moreover, for example, at the time of performing power-running of the electric motor (MOT) 2, in a predetermined third power-running time control, the connection switch control part 21 fixes the second switching element SW2 to OFF and the third switching element SW3 to ON as shown in FIG. 4C for example. Furthermore, with the first switching element SW1 being fixed to OFF, only the second power supply 12 is connected to the inverter 3.

The predetermined third power-running time control is executed, for example, in the case where the absolute value |I2_ave| of the average current I2_ave of the second reactor current I2 is greater than the value as being the sum of the absolute value |Iout| of the output current Iout and the predetermined current value Iα (that is, where |I2_ave|>|Iout|+Iα).

Accordingly, the connection switch control part 21 supplies electric power to the inverter 3, for example, only from the second power supply 12, of which the voltage is higher than the first power supply 11.

For example, in the case where only the second power supply 12 is connected to the inverter 3, the output voltage Vout applied between the positive electrode terminal and the negative electrode terminal on the direct current side of the inverter 3 is equal to the voltage VB2 of the second power supply 12, and electric power is supplied to the inverter 3 only from the second power supply 12.

Figure 6A:
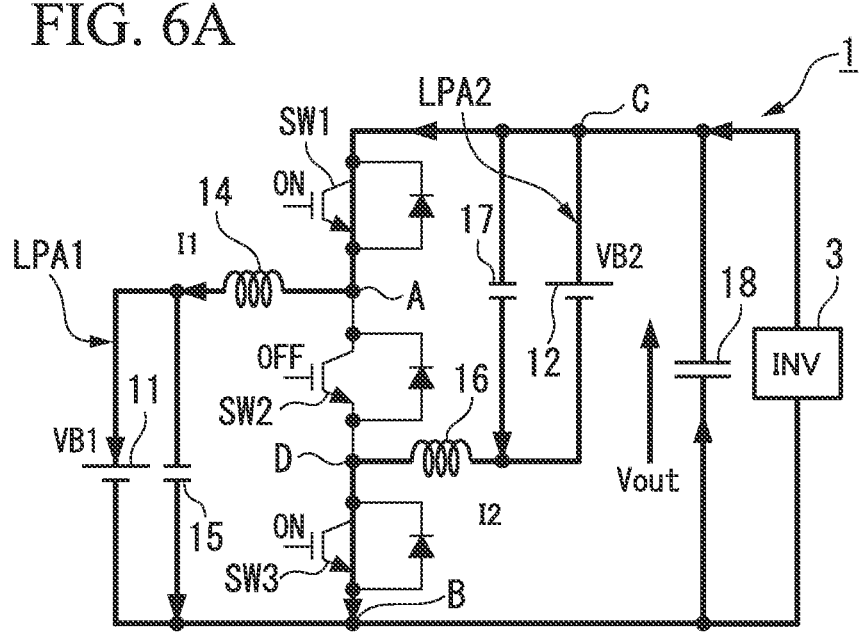
FIG. 6A is a diagram showing a first regenerating time control in the parallel mode as an operating mode of the power supply device of the embodiment of the present invention.

Moreover, for example, at the time of performing regeneration of the electric motor (MOT) 2, as shown in FIG. 6A for example, in a predetermined first regenerating time control, the connection switch control part 21 forms current loops LPA1 and LPA2, and thereby connects the first power supply 11 and the second power supply 12 to the inverter 3 in parallel.

The predetermined first regenerating time control is executed for example in the case where the absolute value |I1_ave| of the average current I1_ave of the first reactor current I1 and the absolute value |I2_ave| of the average current I2_ave of the second reactor current I2 are smaller than the value as being the sum of the absolute value |Iout| of the output current Iout and the predetermined current value Iα (that is, where |I1_ave|<|Iout|+Iα, and also |I2_ave|<|Iout|+Iα).

Accordingly, the output voltage Vout generated between the positive electrode terminal and the negative electrode terminal on the direct current side of the inverter 3 becomes equal to the voltage VB1 of the first power supply 11 and the voltage VB2 of the second power supply 12, and electric power is equally supplied from the inverter 3 to both of the first power supply 11 and the second power supply 12.

Figure 6B:
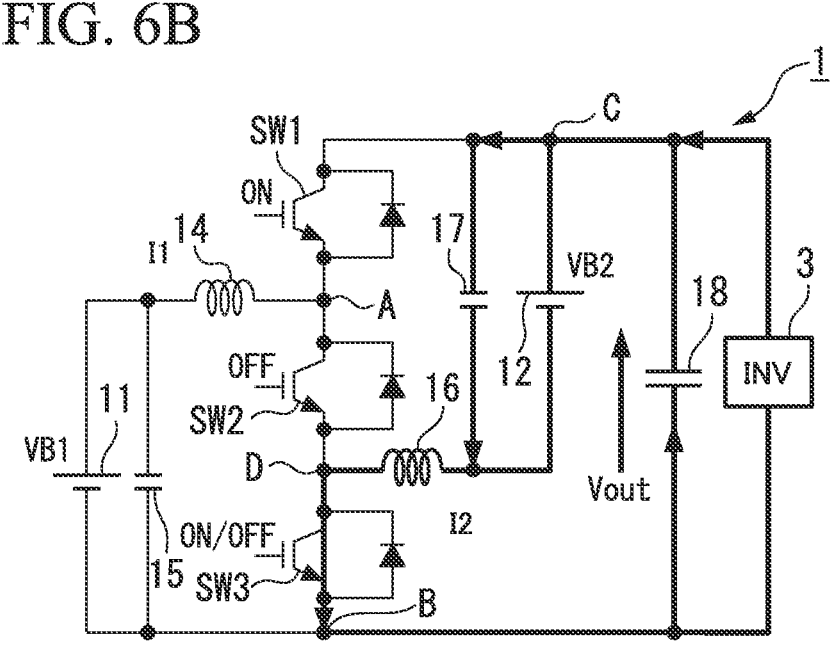
FIG. 6B is a diagram showing a second regenerating time control in the parallel mode as an operating mode of the power supply device of the embodiment of the present invention.

Moreover, for example, at the time of performing regeneration of the electric motor (MOT) 2, in a predetermined second regenerating time control, the connection switch control part 21 fixes the second switching element SW2 to OFF and the first switching element SW1 to ON as shown in FIG. 6B for example. Furthermore, current control is performed such that the second reactor current I2 becomes equal to the output current Iout (I2=Iout), so that regeneration is performed only by the second power supply 12, with ON/OFF driving of the third switching element SW3.

The ON/OFF driving of the third switching element SW3 is such that close (ON) and open (OFF) of the third switching element SW3 is alternately switched according to pulse width modulated (PWM) signals (PWM signals) for example.

The predetermined second regenerating time control is executed for example in the case where the absolute value |I1_ave| of the average current I1_ave of the first reactor current I1 is greater than the value as being the sum of the absolute value |Iout| of the output current Iout and the predetermined current value Iα (that is, where |I1_ave|>|Iout|+Iα), or in the case where the voltage VB1 of the first power supply 11 is greater than the value as being the sum of the voltage VB2 of the second power supply 12 and a predetermined voltage value Vα (that is, where VB1>VB2+Vα).

The predetermined voltage value Vα is an electrical potential associated with wiring resistance between the first power supply 11 and the second power supply 12 for example.

Accordingly, the connection switch control part 21 supplies electric power from the inverter 3, for example, only to the second power supply 12, of which the voltage is lower than the first power supply 11.

For example, in the case of regenerating only with the second power supply 12, the output voltage Vout generated between the positive electrode terminal and the negative electrode terminal on the direct current side of the inverter 3 is equal to the voltage VB1 of the first power supply 11, and electric power is supplied from the inverter 3 only to the second power supply 12.

Figure 6C:
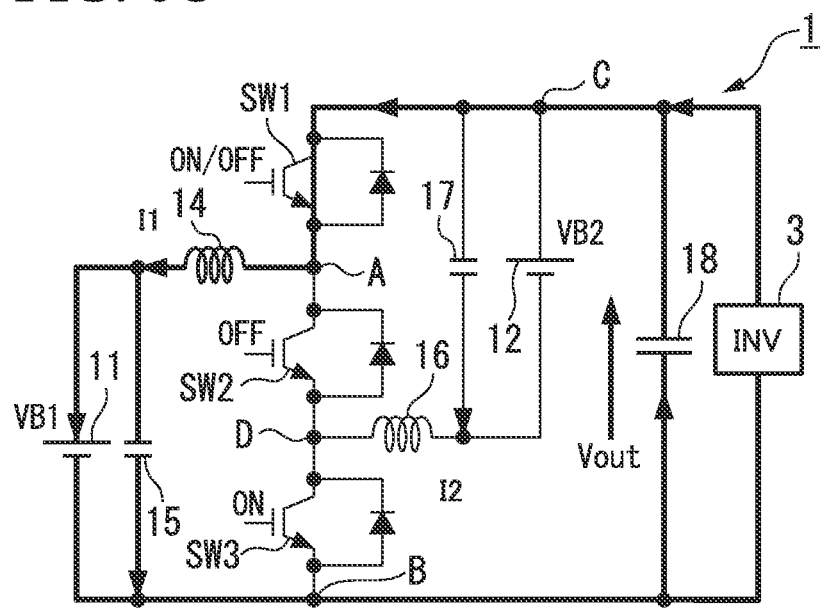
FIG. 6C is a diagram showing a third regenerating time control in the parallel mode as an operating mode of the power supply device of the embodiment of the present invention.

Moreover, for example, at the time of performing regeneration of the electric motor (MOT) 2, in a predetermined third regenerating time control, the connection switch control part 21 fixes the second switching element SW2 to OFF and the third switching element SW3 to ON as shown in FIG. 6C for example. Furthermore, current control is performed such that the first reactor current I1 becomes equal to the output current Iout (I1=Iout), so that regeneration is performed only by the first power supply 11, with ON/OFF driving of the first switching element SW1.

The ON/OFF driving of the first switching element SW1 is such that close (ON) and open (OFF) of the first switching element SW1 is alternately switched according to pulse width modulated (PWM) signals (PWM signals) for example.

The predetermined third regenerating time control is executed for example in the case where the absolute value |I2_ave| of the average current I2_ave of the second reactor current I2 is greater than the value as being the sum of the absolute value |Iout| of the output current Iout and the predetermined current value Iα (that is, where |I2_ave|>|Iout|+Iα), or in the case where the voltage VB2 of the second power supply 12 is greater than the value as being the sum of the voltage VB1 of the first power supply 11 and the predetermined voltage value Vα (that is, where VB2>VB1+Vα).

Accordingly, the connection switch control part 21 supplies electric power from the inverter 3, for example, only to the first power supply 11, of which the voltage is lower than the second power supply 12.

For example, in the case where regeneration is performed only with the first power supply 11, as illustrated at time ta and thereafter shown in FIG. 7 for example, the output current Iout is equal to the first reactor current I1, and the output voltage Vout generated between the positive electrode terminal and the negative electrode terminal on the direct current side of the inverter 3 is equal to the voltage VB1 of the first power supply 11. Accordingly, electric power is supplied from the inverter 3 only to the first power supply 11.

Figure 8A:
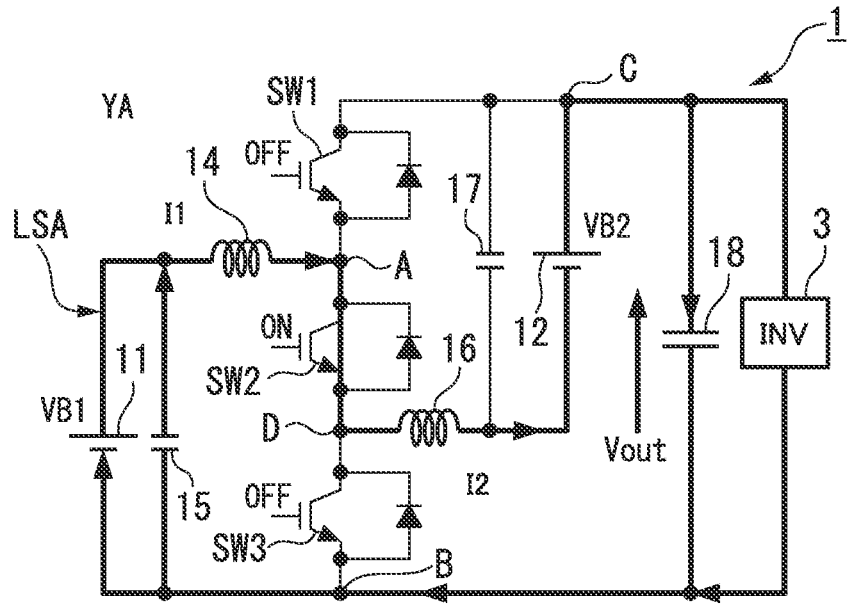
FIG. 8A is a diagram showing a serial state YA in the shift mode as an operating mode of the power supply device of the embodiment of the present invention.
Figure 8B:
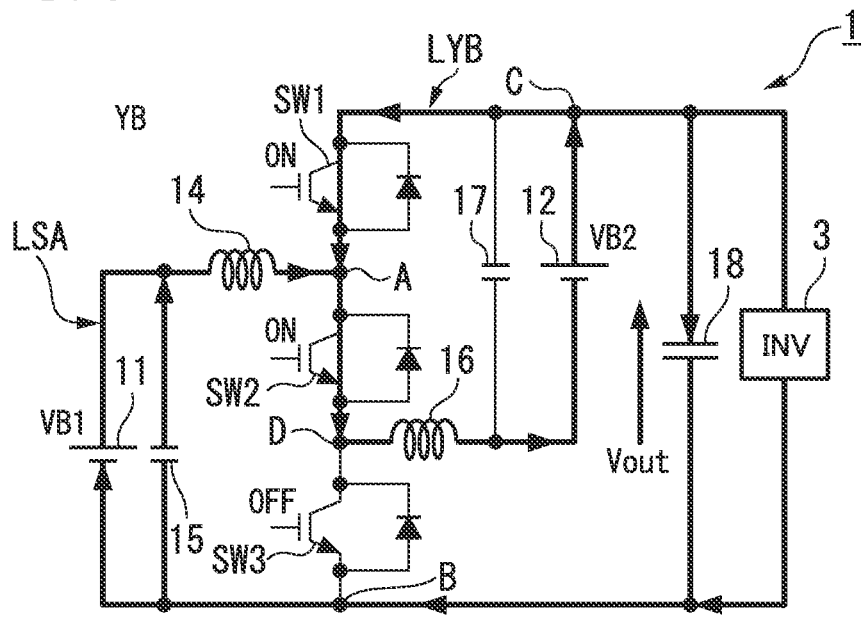
FIG. 8B is a diagram showing a first shift state YB in the shift mode as an operating mode of the power supply device of the embodiment of the present invention.
Figure 8C:
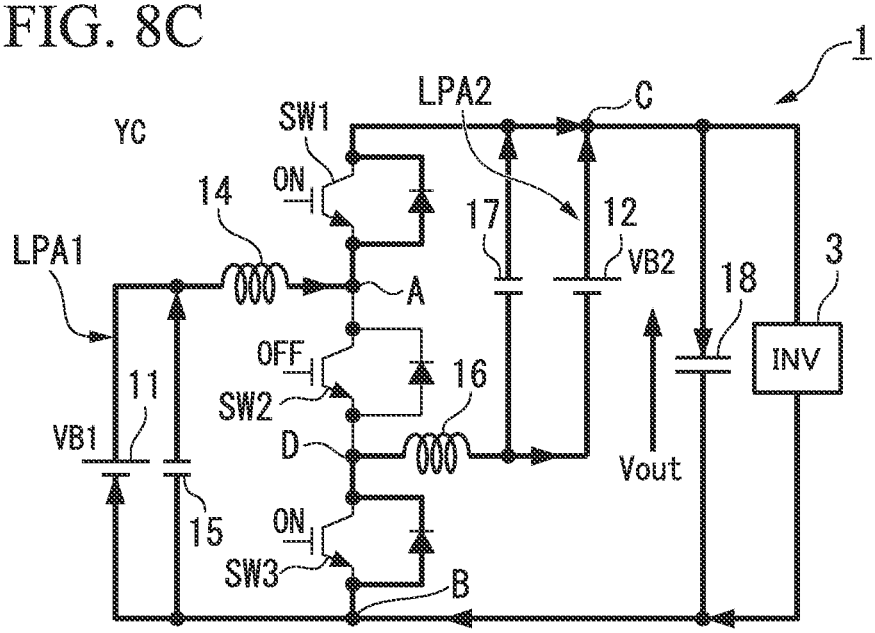
FIG. 8C is a diagram showing a parallel state YC in the shift mode as an operating mode of the power supply device of the embodiment of the present invention.

For example, in the step-up ratio control of the shift mode, the connection switch control part 21 changes the output voltage Vout applied between the positive electrode terminal and the negative electrode terminal on the direct current side of the inverter 3 by repeatedly and alternately switching, for example, to a serial state YA (serial connection state) shown in FIG. 8A and to a parallel state YC (parallel connection state) shown in FIG. 8C.

For example, in the serial state YA shown in FIG. 8A, the connection switch control part 21 fixes the first switching element SW1 and the third switching element SW3 to OFF and fixes the second switching element SW2 to ON, to thereby form a current loop LSA in which the first power supply 11 and the second power supply 12 are connected to the inverter 3 in series.

Moreover, for example, in the parallel state YC shown in FIG. 8C, the connection switch control part 21 fixes the first switching element SW1 and the third switching element SW3 to ON and fixes the second switching element SW2 to OFF, to thereby form current loops LPA1 and LPA2 in which the first power supply 11 and the second power supply 12 are connected to the inverter 3 in parallel.

For example, when switching from the parallel mode to the serial mode, the connection switch control part 21, first, shifts from the parallel mode to the serial state YA, and then, alternately switches to the serial state YA and to the parallel state YC. At this time of alternate switching, first on-duty D1 (=Ton1/(Ton1+Ton2)) is changed gradually from 100% to 0%, and also second on-duty D2 (=Ton2/(Ton1+Ton2)) is changed gradually from 0% to 100%.

The first on-duty D1 (=ton1/(Ton1+Ton2)) and the second on-duty D2 (=Ton2 /(Ton1+Ton2)) are defined by ON time Ton1 of the pair of the first switching element SW1 and the third switching element SW3, and ON time Ton2 of the second switching element SW2.

Moreover, the first on-duty D1 is equal to the third on-duty D3 (D1=D3).

Accordingly, the first reactor 14 and the second reactor 16 are excited by recharging/discharging of the first power supply 11 and the second power supply 12, and thereby, the voltage at both ends of the first reactor 14 and the voltage at both ends of the second reactor 16 are gradually raised. Then, the output voltage Vout applied between the positive electrode terminal and the negative electrode terminal on the direct current side of the inverter 3 is raised from the voltage VB1 of the first power supply 11 to a voltage as being the sum of the voltage VB1 of the first power supply 11 and the voltage VB2 of the second power supply 12 (=VB1+VB2=2×VB1). Then the process shifts to the serial mode after this alternate switching.

On the other hand, for example, when switching from the serial mode to the parallel mode, the connection switch control part 21, first, shifts from the serial mode to the parallel state YC, and then, alternately switches to the parallel state YC and to the serial state YA. At this time of alternate switching, first on-duty D1 (=Ton1/(Ton1+Ton2)) is changed gradually from 0% to 100%, and also second on-duty D2 (=Ton2/(Ton1+Ton2)) is changed gradually from 100% to 0%.

Accordingly, the first reactor 14 and the second reactor 16 are inversely excited by recharging/discharging of the first power supply 11 and the second power supply 12, and thereby, the voltage at both ends of the first reactor 14 and the voltage at both ends of the second reactor 16 are gradually lowered. Then, the output voltage Vout applied between the positive electrode terminal and the negative electrode terminal on the direct current side of the inverter 3 is lowered from the voltage as being the sum of the voltage VB1 of the first power supply 11 and the voltage VB2 of the second power supply 12 (=VB1+VB2=2×VB1) to the voltage VB1 of the first power supply 11. Then the process shifts to the parallel mode after this alternate switching.

In this step-up ratio control of the shift mode, in the serial state YA, the first reactor current I1 and the second reactor current I2 become equal to each other.

In this serial state YA, the voltage VB1 of the first power supply 11, the inductance L1 of the first reactor 14, the first reactor current I1, the inductance L2 of the second reactor 16, the second reactor current I2, the voltage VB2 of the second power supply 12, and the output voltage Vout are expressed by the following equation (1) for example.

[Equation 1]

$$VB1 = L1\frac{dI1}{dt} + L2\frac{dI2}{dt} - VB2 + Vout \quad (1)$$

Then, for example, where inductance L1=inductance L2, the above equation (1) is transformed into an equation shown as the equation (2) below, and in this equation (2), for example, where dI1=ΔI1P, d=second on-duty D2, and voltage VB1=voltage VB2, the equation (2) below is expressed by the following equation (3) for example.

Figure 9A:
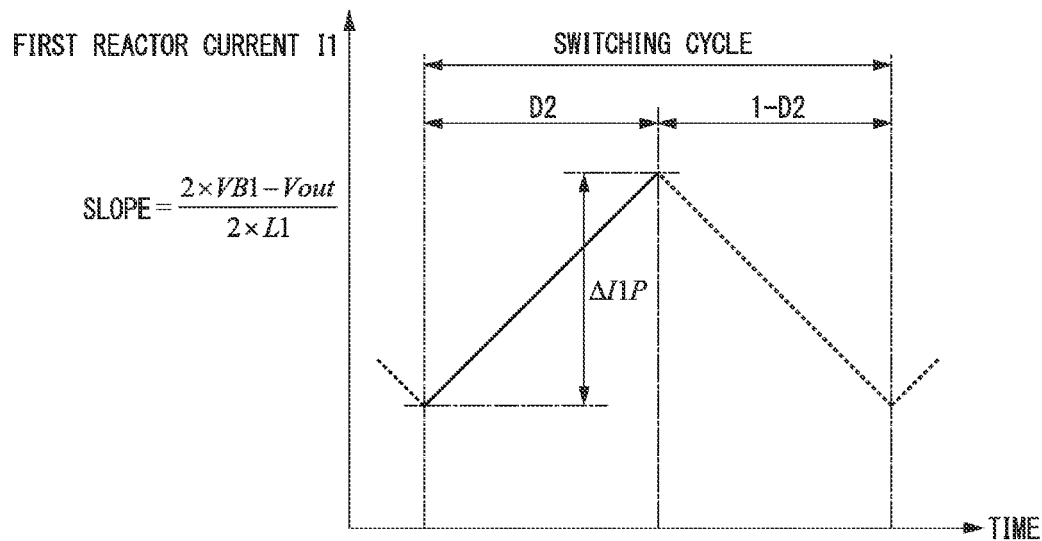
FIG. 9A is a diagram showing first reactor current I1 in step-up ratio control in the serial state YA in the shift mode as an operating mode of the power supply device of the embodiment of the present invention.

That is to say, in the serial state YA, the first reactor current I1 increases only by ΔI1P as shown in FIG. 9A for example.

[Equation 2]

$$dI1 = \frac{VB1 + VB2 - Vout}{2 \times L1}dt \quad (2)$$

[Equation 3]

$$\Delta I1P = \frac{2 \times VB1 - Vout}{2 \times L1}D2 \quad (3)$$

Moreover, in the parallel state YC, the voltage VB1 of the first power supply 11, the inductance L1 of the first reactor 14, the first reactor current I1, and the output voltage Vout are expressed by the following equation (4) for example.

Then, for example, the equation (4) below is transformed into an equation shown as the equation (5) below, and in this equation (5), for example, where dI1=ΔI1S and dt=first on-duty D1 (=1−D2), the equation (5) below is expressed by the following equation (6) for example.

Figure 9B:
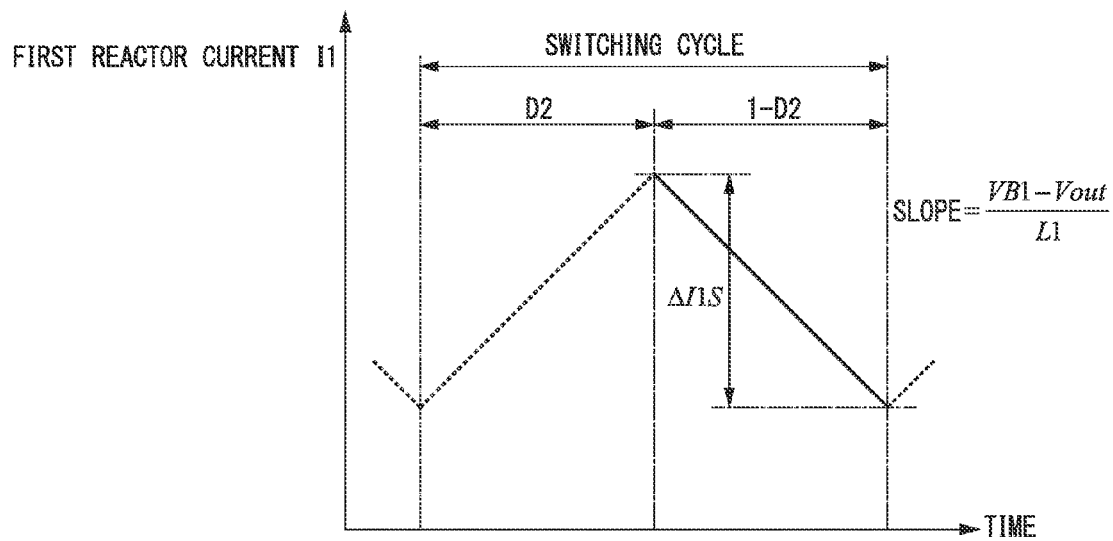
FIG. 9B is a diagram showing first reactor current I1 in step-up ratio control in the parallel state YC in the shift mode as an operating mode of the power supply device of the embodiment of the present invention.

That is to say, in the parallel state YC, the first reactor current I1 decreases only by ΔI1S as shown in FIG. 9B for example.

[Equation 4]

$$VB1 = L1\frac{dI1}{dt} + Vout \quad (4)$$

[Equation 5]

$$dI1 = \frac{VB1 - Vout}{L1}dt \quad (5)$$

[Equation 6]

$$\Delta I1S = \frac{VB1 - Vout}{L1}(1 - D2) \quad (6)$$

At the time of alternate switching between the serial state YA and the parallel state YC, for example as shown in the equation (7) below, the sum of ΔI1P and ΔI1S is zero, and the equation (7) below is transformed into the equations (8) and (9) for example.

Figure 10:
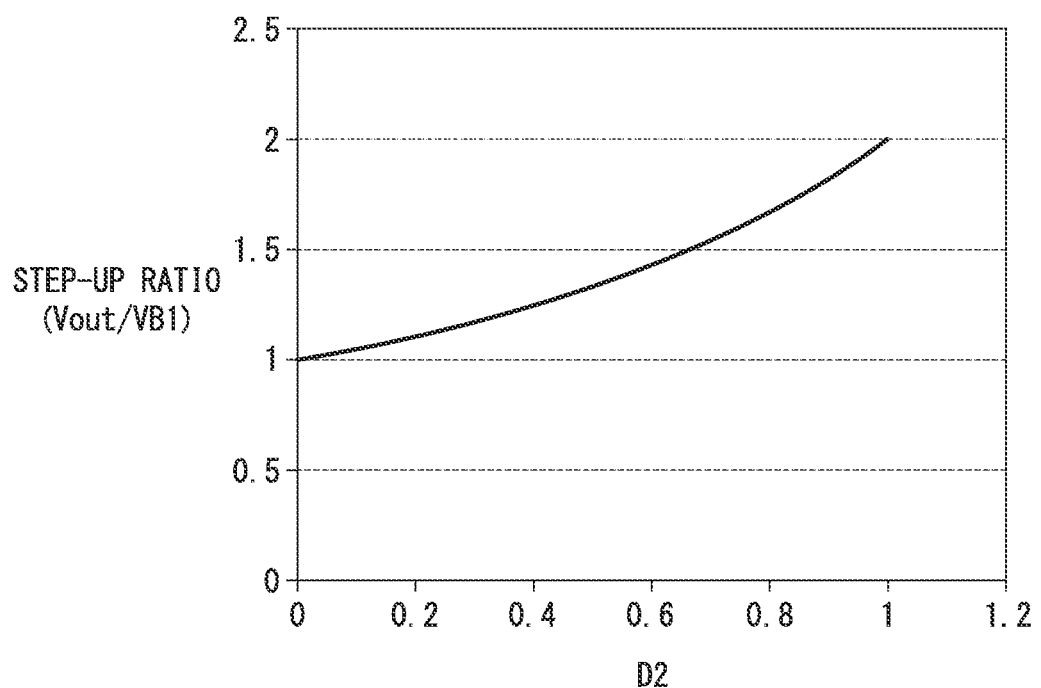
FIG. 10 is a diagram showing step-up ratio and second on-duty D2 in the step-up ratio control of the shift mode as an operating mode of the power supply of the embodiment of the present invention.

That is to say, step-up ratio (=Vout/VB1) is expressed with second on-duty D2 as shown in the equation (9) and FIG. 10.

[Equation 7]

$$\Delta I1P + \Delta I1S = 0 \quad (7)$$

[Equation 8]

$$\frac{2 \times VB1 - Vout}{2 \times L1}D2 + \frac{VB1 - Vout}{L1}(1 - D2) = 0 \quad (8)$$

[Equation 9]

$$\frac{Vout}{VB1} = \frac{2}{2 - D2} \quad (9)$$

Furthermore, in the case where the relationship between the voltage VB1 of the first power supply 11, the voltage VB2 of the second power supply 12, and the output voltage Vout is desired to be set as VB1<Vout<VB1+VB2, or VB2<Vout<VB1+VB2, the connection switch control part 21 can control the output voltage Vout by taking D2 calculated in the equation (9) above for the first on-duty D1 (=Ton1/(Ton1+Ton2)=1−D2) and the second on-duty D2 (=Ton2/(Ton1+Ton2)=D2).

Figure 8D:
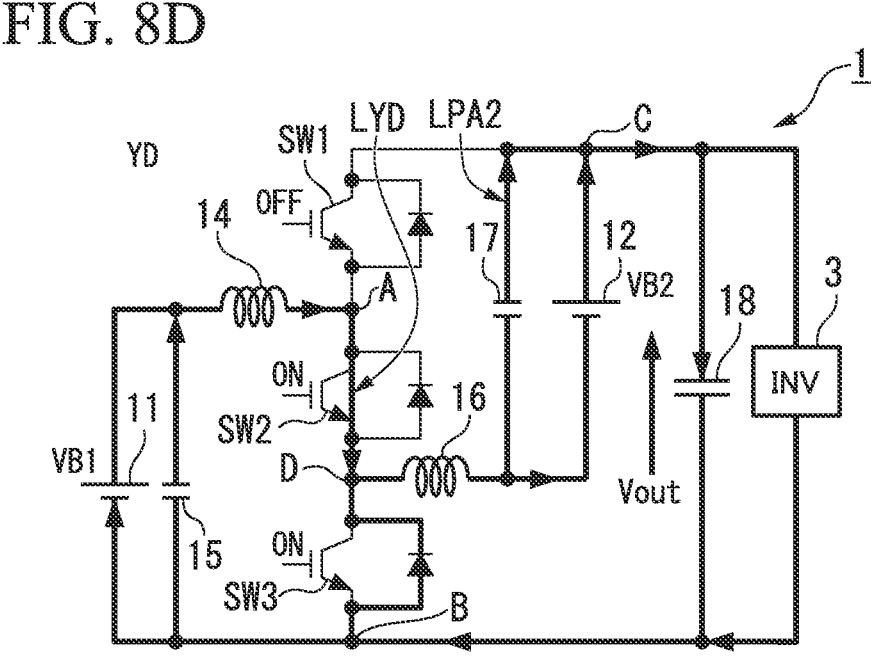
FIG. 8D is a diagram showing a second shift state YD in the shift mode as an operating mode of the power supply device of the embodiment of the present invention.

The connection switch control part 21 provides a first period with either one of a first shift state YB and a second shift state YD shown in FIG. 8B and FIG. 8D, and a second period with the other one, within a voltage change period during which, for example, in the current control of the shift mode, the output voltage Vout applied between the positive electrode terminal and the negative electrode terminal on the direct current side of the inverter 3 can be changed by repeatedly and alternately switching to the serial state YA and to the parallel state YC.

For example, in the first shift state YB shown in FIG. 8B, the connection switch control part 21 fixes the first switching element SW1 and the second switching element SW2 to ON, and the third switching element SW3 to OFF, to thereby form a current path LYB between the first node A and the third node C in addition to the current loop LSA, and makes the potentials of the first node A and the third node C the same.

Moreover, for example, in the second shift state YD shown in FIG. 8D, the connection switch control part 21 fixes the first switching element SW1 to OFF and the second switching element SW2 and the third switching element SW3 to ON, to thereby form a current path LYD between the first node A and the fourth node D in addition to the current loop LPA2, and makes the potentials of the first node A and the fourth node D the same.

Hereunder, there is described a current control (first current control) of the shift mode in which the second reactor current I2 is flowed more than the first reactor current I1 in the case, for example, where the voltage VB2 of the second power supply 12 is higher than the voltage VB1 of the first power supply 11 (for example, VB2>VB1) and also the remaining energy amount of the first power supply 11 (for example, the remaining capacity) has been reduced to or below a predetermined voltage.

Figure 11:
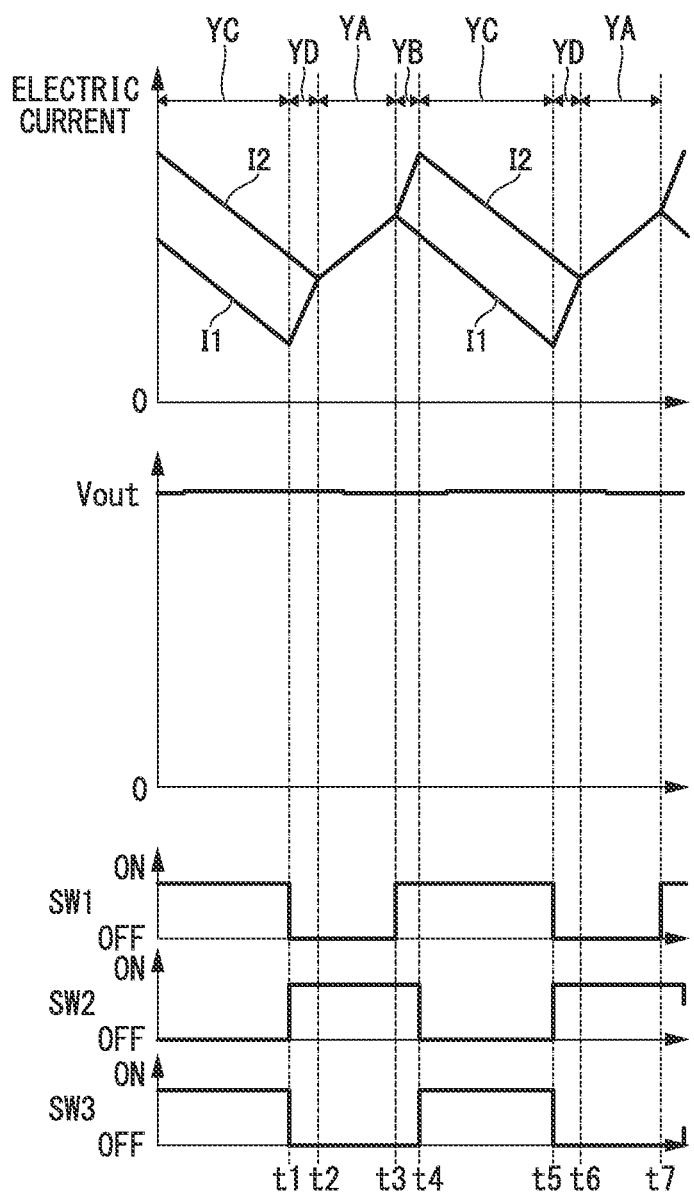
FIG. 11 is a diagram showing first and second reactor currents I1, I2, output voltage Vout, and the state of first to third switching elements in current control of the shift mode as an operating mode of the power supply device of the embodiment of the present invention.

First, for example, with the serial state YA shown in FIG. 8A, the connection switch control part 21 changes the first reactor current I1 and the second reactor current I2 equally with an increasing trend while maintaining the output voltage Vout substantially constant as observed during the period from time t2 to time t3 illustrated in FIG. 11 for example.

Next, for example, with the first shift state YB shown in FIG. 8B, the connection switch control part 21 changes the first reactor current I1 with a decreasing trend and the second reactor current I2 with an increasing trend while maintaining the output voltage Vout substantially constant as observed during the period from time t3 to time t4 illustrated in FIG. 11 for example.

Next, for example, with the parallel state YC shown in FIG. 8C, the connection switch control part 21 changes the first reactor current I1 and the second reactor I2, with a constant differential current of each other, with a decreasing trend, while maintaining the output voltage Vout substantially constant as observed during the period from time t4 to time t5 illustrated in FIG. 11 for example.

Next, for example, with the second shift state YD shown in FIG. 8D, the connection switch control part 21 changes the first reactor current I1 with an increasing trend and changes the second reactor current I2 with a decreasing trend until the first reactor current I1 and the second reactor current I2 become equal to each other, while maintaining the output voltage Vout substantially constant as observed during the period from time t5 to time t6 illustrated in FIG. 11 for example.

That is to say, in the first current control in the case, for example, where the voltage VB2 of the second power supply 12 is higher than the voltage VB1 of the first power supply 11, and the second reactor current I2 is flowed more than the first reactor current I1, the connection switch control part 21 sequentially executes the serial state YA, the first shift state YB, the parallel state YC, and the second shift state YD.

Hereunder, there is described a current control (second current control) of the shift mode in which the first reactor current I1 is flowed more than the second reactor current I2 in the case, for example, where the voltage VB1 of the first power supply 11 is higher than the voltage VB2 of the second power supply 12 (for example, VB1>VB2) and also the remaining energy amount of the second power supply 12 (for example, the remaining capacity) has been reduced to or below a predetermined voltage.

For example, in the second current control, the connection switch control part 21 executes; the serial state YA and the parallel state YC which are the same as the serial state YA and the parallel state YC of the first current control, and the first shift state YB and the second shift state YD which are obtained by inversing the ON/OFF state of the first switching element SW1 and the third switching element SW3 in the first shift state YB and the second shift state YD of the first current control.

That is to say, for example, in the first shift state YB of the second current control, the connection switch control part 21 fixes the third switching element SW3 and the second switching element SW2 to ON and the first switching element SW1 to OFF, to thereby make the potentials of the first node A and the fourth node D the same.

Furthermore, for example, in the second shift state YD of the second current control, the connection switch control part 21 fixes the first switching element SW1 and the second switching element SW2 to ON and the third switching element SW3 to OFF, to thereby make the potentials of the first node A and the third node C the same.

Then, in the second current control, the connection switch control part 21 sequentially executes the serial state YA, the first shift state YB, the parallel state YC, and the second shift state YD for example.

For example, in the current control of the shift mode, the differential current $\Delta I = I1 - I2$ is expressed for example as the following equation (10) based on the switching cycle T, where voltage VB1=voltage VB2, and L=inductance L1=inductance L2.

[Equation 10]

$$I1 - I2 = \Delta I = \frac{T \times D1 \times Vout}{L}(1 - D2 - D1) \qquad (10)$$

Figure 12:
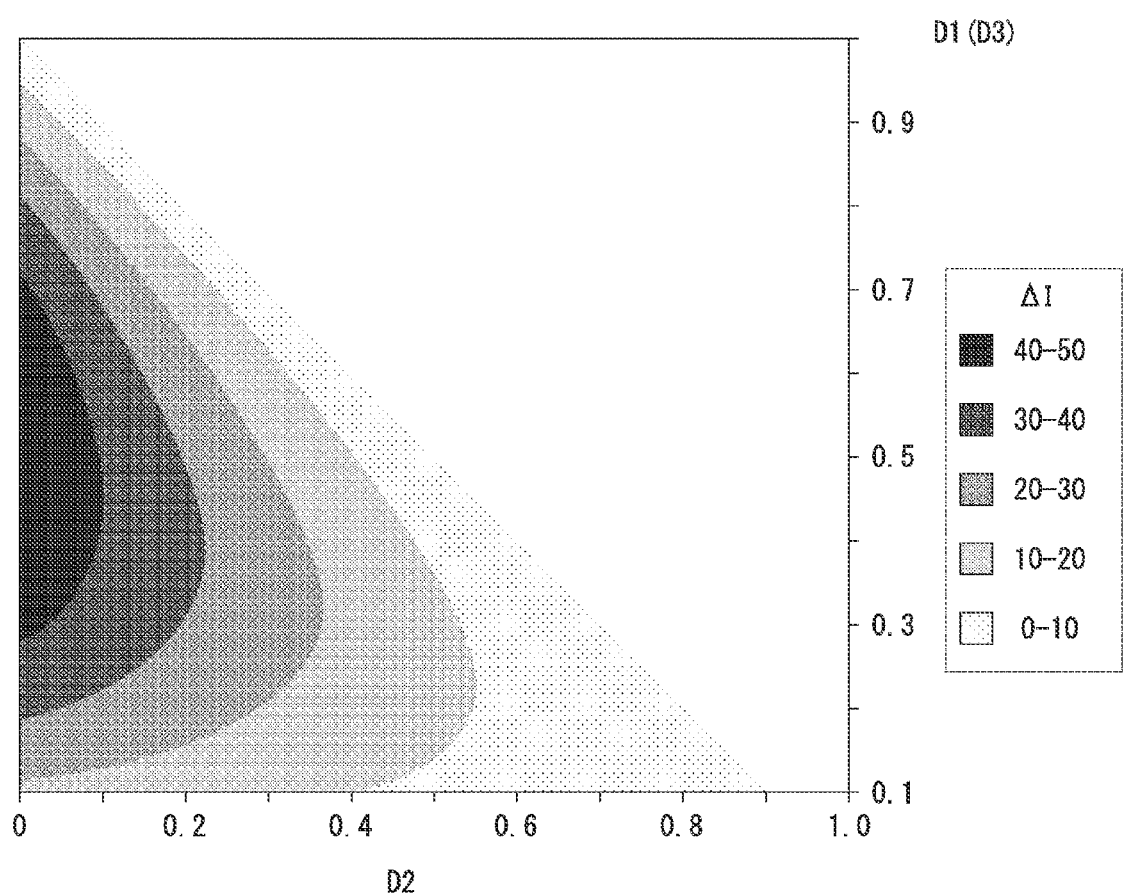
FIG. 12 is a diagram showing an example of a corresponding relationship between differential current Δ of first and second reactor currents I1, I2, and first and second on-duties D1, D2, and D3, in current control of the shift mode as an operating mode of the power supply device of the embodiment of the present invention.

Therefore, for example, based on: a map that shows a corresponding relationship shown in the equation (9) above or in FIG. 10 between step-up ratio (=Vout/VB1) and second on-duty D2; and a map that shows a corresponding relationship shown in the equation (10) above or in FIG. 12 between first and second on-duties D1 and D2 and differential current $\Delta I$ for example, the connection switch control part 21 can control current ratio of the first reactor current I1 and the second reactor current I2 according to the step-up ratio (=Vout/VB1).

For example, in the serial mode, the connection switch control part 21 cannot control current ratio of the first power supply 11 and the second power supply 12.

Figure 13A:
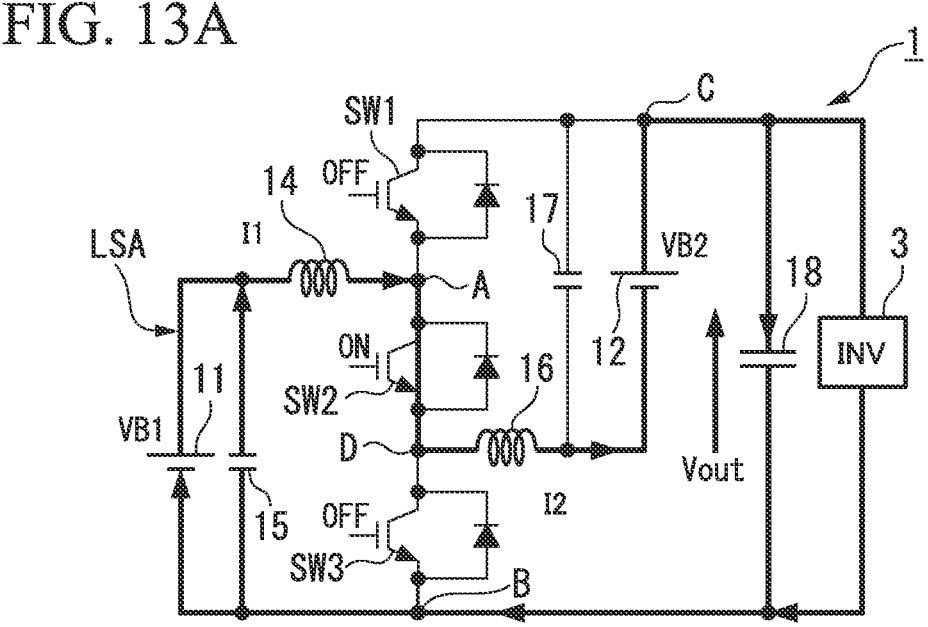
FIG. 13A is a diagram showing a serial mode of the power supply device of the embodiment of the present invention.

In this serial mode, in the case, for example, where the first power supply 11 and the second power supply 12 are connected to only the inverter 3 in series as shown in FIG. 13A, the first reactor current I1 and the second reactor current I2 become equal to each other at the time of performing power-running and regeneration of the electric motor (MOT) 2.

In the case where a load is individually connected to the first power supply 11 and to the second power supply 12 in this serial mode, a differential current occurs between the first reactor current I1 and the second reactor current I2, depending on the load current.

Figure 13B:
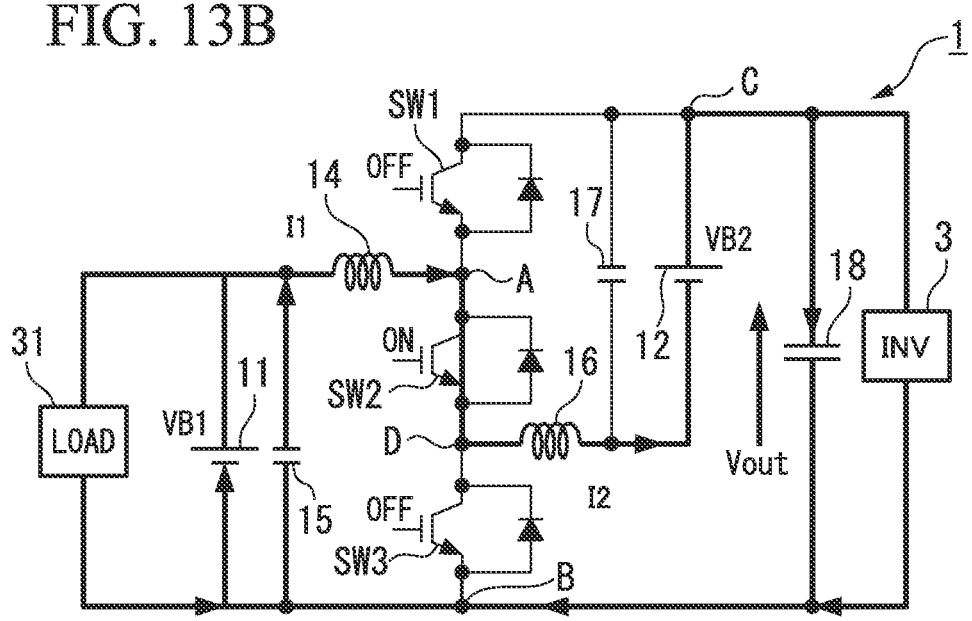
FIG. 13B is a diagram showing a serial mode of the power supply device of the embodiment of the present invention.

In the case, for example, where a load 31 is connected to the first power supply 11 as shown in FIG. 13B, the ratio of the first power supply 11 is higher than the ratio of the second power supply 12, with respect to the current of the load 31.

When operating the electric motor 2 such as a three-phase brushless DC motor to perform power-running, the electric motor control part 22 converts the direct current electric power applied between the positive electrode terminal and the negative electrode terminal on the direct current side of the inverter 3 into three-phase alternating current electric power, and commutates sequentially the power conduction to each phase of the electric motor 2, to thereby conduct alternating current of each phase. On the other hand, at the time of operating regeneration of the electric motor 2 for example, the generated alternating current electric power output from the electric motor 2 is converted to direct current electric power, while achieving synchronization based on the rotational angle of the electric motor 2.

The power supply device 1 of the embodiment of the present invention is provided with the above configuration. Next, there is described an operation of the power supply device 1, in particular, a process for changing current ratio (or, electric power ratio of output or input) of the first power supply 11 and the second power supply 12 in the parallel mode or the shift mode.

Figure 14:
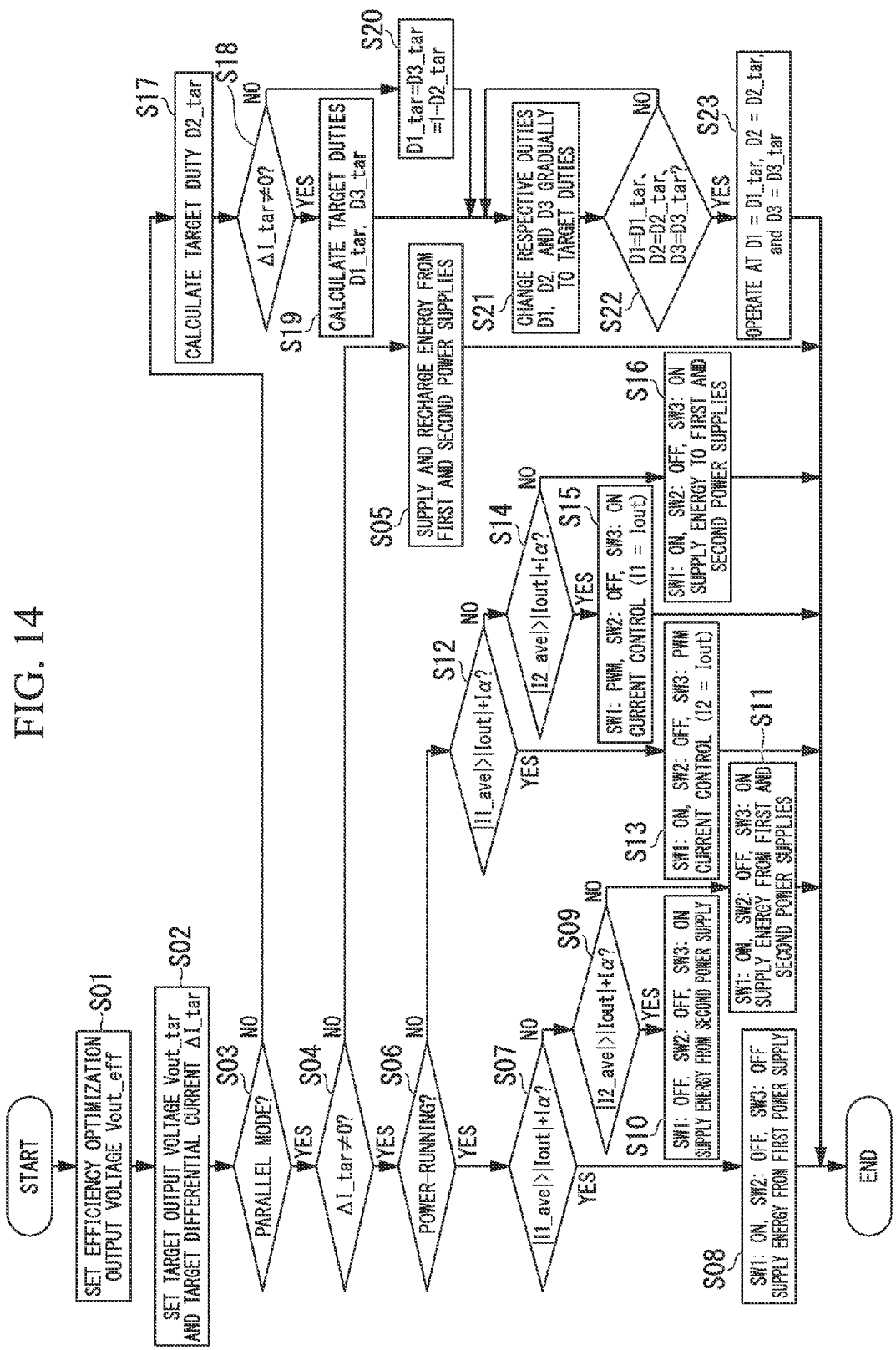
FIG. 14 is a flow chart of a process of changing current ratio of a first power supply and a second power supply (or electric power ratio of output or input) in an operation, particularly in the parallel mode or shift mode, of the power supply device of the embodiment of the present invention.

First, for example, in step S01 shown in FIG. 14, based on rotation speed of the electric motor 2 and loads of various auxiliary devices (not shown in the figure) and loads for driving the vehicle for example, there is set an output voltage (efficiency optimization output voltage) Vout_eff required for optimizing the operating efficiency of a power transmission mechanism including the various auxiliary devices and the electric motor 2 (for example, driving efficiency of the electric motor 2 and the inverter 3).

Next, in step S02, based on the efficiency optimization output voltage Vout_eff, and the balance state (for example, the magnitude of difference) of the remaining energy amounts (for example, the remaining capacity) of the first power supply 11 and the second power supply 12, there are set a target output voltage Vout_tar and a target differential current ΔI_tar (that is, a target value of differential current between the first reactor current I1 and the second reactor current I2), with reference to a predetermined map that is preliminarily set.

For example, the predetermined map shows a predetermined corresponding relationship between the efficiency optimization output voltage Vout_eff, the difference in the remaining energy amount of the first power supply 11 and the second power supply 12, and the target output voltage Vout_tar and the target differential current ΔI_tar.

For example, the predetermined map is such that according to the difference in the remaining energy amount of the first power supply 11 and the second power supply 12, the target differential current ΔI_tar and the target output voltage Vout_tar are set so as to minimize this difference.

Next, in step S03, it is determined whether or not the operating mode of the power supply device 1 is the parallel mode.

If the result of this determination is "NO", the process proceeds to step S17 described later.

On the other hand, if the result of this determination is "YES", the process proceeds to step S04.

In step S04, for example, it is determined whether or not the target differential current ΔI_tar is a non-zero value.

If the result of this determination is "NO", the process proceeds to step S05. In this step S05, control is performed so that energy is supplied/received (supply and recharge) between the first power supply 11 and the second power supply 12 and the load such as the electric motor 2, and then the process ends.

On the other hand, if the result of this determination is "YES", the process proceeds to step S06.

In step S06, it is determined whether or not the operating mode of the power supply device 1 is power-running.

If the result of this determination is "NO", the process proceeds to step S12 described later.

On the other hand, if the result of this determination is "YES", the process proceeds to step S07.

Next, in step S07, it is determined whether or not the absolute value |I1_ave| of the average current I1_ave of the first reactor current I1 is greater than the value as being the sum of the absolute value |Iout| of the output current Iout flowing between the positive electrode terminal and the negative electrode terminal on the direct current side of the inverter 3, and the predetermined current value Iα (that is, whether or not |I1_ave|>|Iout|+Iα).

If the result of this determination is "NO", the process proceeds to step S09 described later.

On the other hand, if the result of this determination is "YES", the process proceeds to step S08.

Next, in step S08, the first switching element SW1 is fixed to ON, the second switching element SW2 is fixed to OFF, and the third switching element SW3 is fixed to OFF so that energy is supplied to the inverter 3 only from the first power supply 11. Then the process ends.

Furthermore, in step S09, it is determined whether or not the absolute value |I2_ave| of the average current I2_ave of the second reactor current I2 is greater than the value as being the sum of the absolute value |Iout| of the output current Iout flowing between the positive electrode terminal and the negative electrode terminal on the direct current side of the inverter 3, and the predetermined current value Iα (that is, whether or not |I2_ave|>|Iout|+Iα).

If the result of this determination is "NO", the process proceeds to step S11 described later.

On the other hand, if the result of this determination is "YES", the process proceeds to step S10.

Next, in step S10, the first switching element SW1 is fixed to OFF, the second switching element SW2 is fixed to OFF, and the third switching element SW3 is fixed to ON so that energy is supplied to the inverter 3 only from the second power supply 12. Then the process ends.

Moreover, in step S11, the first switching element SW1 is fixed to ON, the second switching element SW2 is fixed to OFF, and the third switching element SW3 is fixed to ON so that energy is supplied to the inverter 3 from the first power supply 11 and the second power supply 12. Then the process ends.

Furthermore, in step S12, it is determined whether or not the absolute value |I1_ave| of the average current I1_ave of the first reactor current I1 is greater than the value as being the sum of the absolute value |Iout| of the output current Iout flowing between the positive electrode terminal and the negative electrode terminal on the direct current side of the inverter 3, and the predetermined current value Iα (that is, whether or not |I1_ave|>|Iout|+Iα).

If the result of this determination is "NO", the process proceeds to step S14 described later.

On the other hand, if the result of this determination is "YES", the process proceeds to step S13.

Next, in step S13, the control is performed such that the first switching element SW1 is fixed to ON, the second switching element SW2 is fixed to OFF, and the third switching element SW3 is driven ON/OFF, so that, for example, the absolute value |I2_ave| of the average current I2_ave of the second reactor current I2 matches the absolute value |Iout| of the output current Iout. Then the process ends.

Furthermore, in step S14, it is determined whether or not the absolute value |I2_ave| of the average current I2_ave of the second reactor current I2 is greater than the value as being the sum of the absolute value |Iout| of the output current Iout flowing between the positive electrode terminal and the negative electrode terminal on the direct current side of the inverter 3, and the predetermined current value Iα (that is, whether or not |I2_ave|>|Iout|+Iα).

If the result of this determination is "NO", the process proceeds to step S16 described later.

On the other hand, if the result of this determination is "YES", the process proceeds to step S15.

Next, in step S15, the control is performed such that the third switching element SW3 is fixed to ON, the second switching element SW2 is fixed to OFF, and the first switching element SW1 is driven ON/OFF, so that, for example, the absolute value |I1_ave| of the average current I1_ave of the first reactor current I1 matches the absolute value |Iout| of the output current Iout. Then the process ends.

Next, in step S16, the first switching element SW1 is fixed to ON, the second switching element SW2 is fixed to OFF, and the third switching element SW3 is fixed to ON so that energy is regenerated from the inverter 3 to the first power supply 11 and the second power supply 12. Then the process ends.

Moreover, in step S17, the operating mode of the power supply device 1 is determined as being the execution mode of the step-up ratio control in the shift mode, and for example, based on a map that shows a corresponding relationship between step-up ratio (=Vout/VB1) shown in the equation (9) above or FIG. 10, and second on-duty D2, a second target on-duty D2_tar is calculated, using the target output voltage Vout_tar.

Next, in step S18, for example, it is determined whether or not the target differential current ΔI_tar is a non-zero value.

If the result of this determination is "NO", the process proceeds to step S20 described later.

On the other hand, if the result of this determination is "YES", the process proceeds to step S19.

Then, in step S19, for example, based on: a map that shows a corresponding relationship shown in the equation (9) above or in FIG. 10 between step-up ratio (=Vout/VB1) and second on-duty D2; and a map that shows a corresponding relationship shown in the equation (10) above or in FIG. 12 between first and second on-duties D1 and D2 and differential current ΔI for example, first and third target on-duties D1_tar and D3_tar are calculated, using the target output voltage Vout_tar and the target differential current ΔI_tar.

Moreover, in step S20, the first and third target on-duties D1_tar and D3_tar are calculated with a formula (=1−D2_tar) that uses the second target on-duty D2_tar.

Next, in step S21, a duty control is executed in which the actual first to third on-duties D1, D2, and D3 are gradually changed with a predetermined changing trend toward the first to third target on-duties D1_tar, D2_tar, and D3_tar.

Next, in step S22, it is determined whether or not the actual first to third on-duties D1, D2, and D3 are the same as the first to third target on-duties D1_tar, D2_tar, and D3_tar.

If the result of this determination is "NO", the process returns to step S21, and the determination process of step S22 is executed.

On the other hand, if the result of this determination is "YES", the process proceeds to step S23.

Then, in step S23, the first to third on-duties D1, D2, and D3 at this point in time are maintained, and the process ends.

As has been described above, according to the power supply device 1 of the embodiment of the present invention, by providing a first period and a second period within the voltage change period during which the serial state YA and the parallel state YC are repeatedly and alternately switched, it is possible to perform, in addition to the step-up ratio control, control of current ratio of the first power supply 11 and the second power supply 12 (or electric power ratio of output or input). Accordingly, output balance of the first power supply 11 and the second power supply 12 can be arbitrarily set, and it is possible, while constantly enabling electric power supply from both of the first power supply 11 and the second power supply 12, to prevent the electric power supply capacity of either one from being limited by the electric power supply capacity of the other one.

First and Second Modified Examples

In the embodiment described above, in the current control of the shift mode, the connection switch control part 21 sequentially executes the serial state YA, the first shift state YB, the parallel state YC, and the second shift state YD. However, it is not limited to this, and as with a first modified example shown in FIG. 15A for example, the serial state YA, the first shift state YB, the second shift state YD, the serial state YA, and the parallel state YC may be executed sequentially.

Figure 15A:
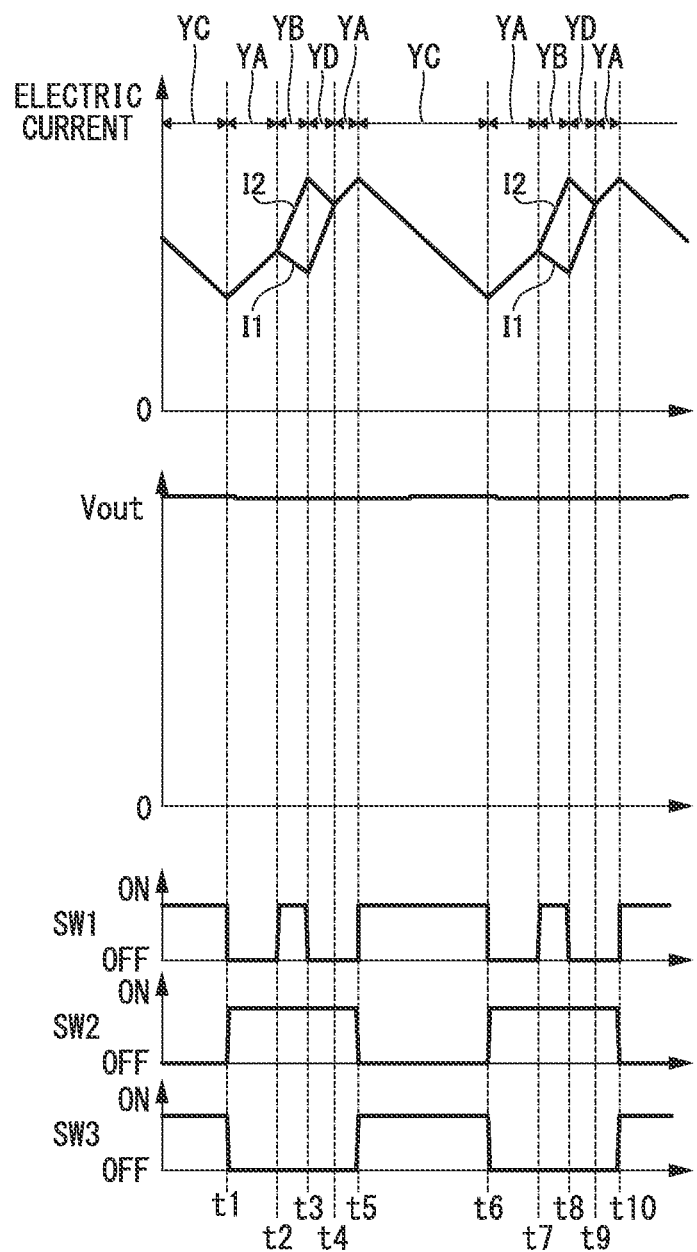
FIG. 15A is a diagram showing first and second reactor currents I1, I2, output voltage Vout, and the state of first to third switching elements in current control of the shift mode as an operating mode of a power supply device of a first modified example of the embodiment of the present invention.
Figure 15B:
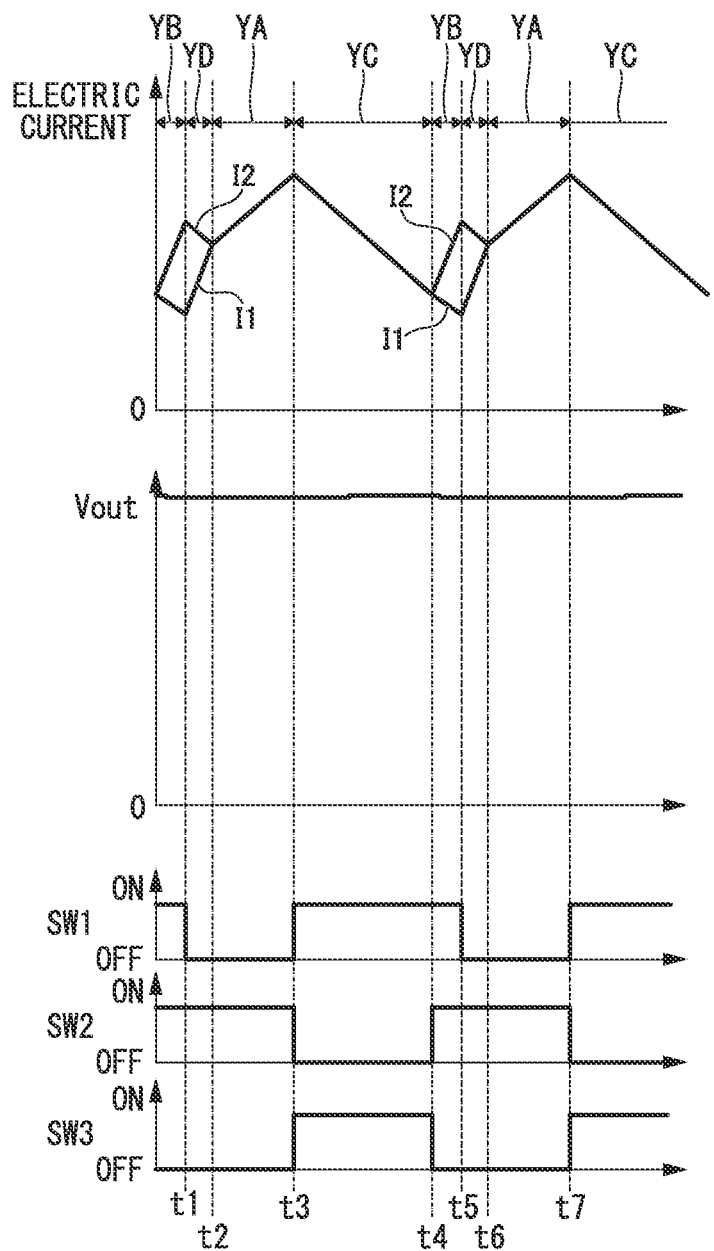
FIG. 15B is a diagram showing first and second reactor currents I1, I2, output voltage Vout, and the state of first to third switching elements in current control of the shift mode as an operating mode of a power supply device of a second modified example of the embodiment of the present invention.

Furthermore, as with a second modified example shown in FIG. 15B for example, the serial state YA, the parallel state YC, the first shift state YB, and the second shift state YD may be executed sequentially.

In other words, the first period and the second period may be provided at appropriate timings within the period during which the serial state YA and the parallel state YC are repeatedly and alternately switched. Then, there may be first provided the period, among the first period and the second period, during which desired current is increased, and then, there may be provided the period, among the first period and the second period, during which desired current is decreased.

For example, from the state where the first reactor current I1 and the second reactor current I2 are equal to each other (the serial state YA in the embodiment and the first modified example above, or the parallel state YC in the second modified example), there is provided first a period, among the first period and the second period, during which desired current is increased (for example, the first shift state YB where the second reactor current I2 is increased in the first current control). After this, there may be provided a period, among the first period and the second period, during which the desired current is decreased (for example, the second shift state YD where the second reactor current I2 is decreased in the first current control).

Hereunder, there is described a current control of the shift mode in the case where the second reactor current I2 is flowed more than the first reactor current I1 in the first modified example (first current control).

First, for example, with the serial state YA, the connection switch control part 21 changes the first reactor current I1 and the second reactor current I2 equally with an increasing trend while maintaining the output voltage Vout substantially constant as observed during the period from time t1 to time t2 illustrated in FIG. 15A for example.

Next, for example, with the first shift state YB, the connection switch control part 21 changes the first reactor current I1 with a decreasing trend and the second reactor current I2 with an increasing trend while maintaining the output voltage Vout substantially constant as observed during the period from time t2 to time t3 illustrated in FIG. 15A for example.

Next, for example, with the second shift state YD, the connection switch control part 21 changes the first reactor current I1 with an increasing trend and changes the second reactor current I2 with a decreasing trend until the first reactor current I1 and the second reactor current I2 become equal to each other, while maintaining the output voltage Vout substantially constant as observed during the period from time t3 to time t4 illustrated in FIG. 15A for example.

Next, for example, with the serial state YA, the connection switch control part 21 changes the first reactor current I1 and the second reactor current I2 equally with an increasing trend while maintaining the output voltage Vout substantially constant as observed during the period from time t4 to time t5 illustrated in FIG. 15A for example.

Next, for example, with the parallel state YC, the connection switch control part 21 changes the first reactor current I1 and the second reactor current I2 equally with a decreasing trend while maintaining the output voltage Vout substantially constant as observed during the period from time t5 to time t6 illustrated in FIG. 15A for example.

Hereunder, there is described a current control of the shift mode in the case where the second reactor current I2 is flowed more than the first reactor current I1 in the second modified example (first current control).

First, for example, with the serial state YA, the connection switch control part 21 changes the first reactor current I1 and the second reactor current I2 equally with an increasing trend while maintaining the output voltage Vout substantially constant as observed during the period from time t2 to time t3 illustrated in FIG. 15B for example.

Next, for example, with the parallel state YC, the connection switch control part 21 changes the first reactor current I1 and the second reactor current I2 equally with a decreasing trend while maintaining the output voltage Vout substantially constant as observed during the period from time t3 to time t4 illustrated in FIG. 15B for example.

Next, for example, with the first shift state YB, the connection switch control part 21 changes the first reactor current I1 with a decreasing trend and the second reactor current I2 with an increasing trend while maintaining the output voltage Vout substantially constant as observed during the period from time t4 to time t5 illustrated in FIG. 15B for example.

Next, for example, with the second shift state YD, the connection switch control part 21 changes the first reactor current I1 with an increasing trend and changes the second reactor current I2 with a decreasing trend until the first reactor current I1 and the second reactor current I2 become equal to each other, while maintaining the output voltage Vout substantially constant as observed during the period from time t5 to time t6 illustrated in FIG. 15B for example.

In the first modified example and the second modified example described above, in the current control of the shift mode in the case where the first reactor current I1 is flowed more than the second reactor current I2 (second current control), there may be executed; the serial state YA and the parallel state YC that are the same as the serial state YA and the parallel state YC of the first current control, and the first shift state YB and the second shift state YD that are obtained by inversing the ON/OFF state of the first and third switching elements SW1 and SW3 in the first shift state YB and the second shift state YD of the first current control.

According to the first modified example and the second modified example, compared to the embodiment described above, the peak value of the second reactor current I2 in the first current control and the peak value of the first reactor current I1 in the second current control can be made smaller.

Accordingly, the first reactor 14 and the second reactor 16 can be made smaller, and losses can be reduced.

In the embodiment described above, the first reactor 14 and the second reactor 16 may be magnetically coupled, for example, by winding on a common core so as to share the magnetic path. As a result, the first reactor 14 and the second reactor 16 can be miniaturized.

In the embodiment described above, the first reactor 14 may be arranged between the first power supply 11 and the second node B.

Moreover, in the embodiment described above, the second reactor 16 may be arranged between the second power supply 12 and the third node C.

In the embodiment described above, there may be provided for example an inverter for a generator that is connected to the inverter 3 in parallel, and a generator that is controlled by this inverter for a generator.

The technical scope of the present invention is not limited to the embodiment described above, and various modifications may be made to the embodiment above without departing from the spirit and scope of the invention. That is to say, the configuration of the embodiment described above is merely an example, and modifications may be made appropriately.

What is claimed is:

1. A power supply device comprising:
   a plurality of output circuits, each provided with a reactor and a power supply connected in series; and
   a control device that performs a step-up operation of the power supply at a predetermined step-up ratio in a switching cycle that comprises a first period, second period, a third period and a fourth period so as to repeatedly and alternately switch the serial connection state and the parallel connection state in the switching cycle,
   wherein:
   a first period during which current that flows to at least one of the reactors of part of the plurality of output circuits changes with an increasing trend, and current that flows to the other reactor changes with a decreasing trend;
   a second period during which current that flows to the one reactor changes with a decreasing trend and current that flows to the other reactor changes with an increasing trend;
   a third period during which a serial connection state, where the plurality of output circuits are connected in series to an electrical load, is set; and
   a fourth period during which a parallel connection state, where the plurality of output circuits are connected in parallel to the electrical load, is set;
   wherein, in the first period, the control device configured to maintain an output voltage of the power supply device substantially constant; and
   wherein, in the second period, the control device configured to change the current that flows to the one reactor and the current that flows to the other reactor until the current that flows to the one reactor and the current that flows to the other reactor become equal while maintaining an output voltage of the power supply device substantially constant.

* * * * *